(12) United States Patent
Zhang et al.

(10) Patent No.: US 12,501,341 B2
(45) Date of Patent: Dec. 16, 2025

(54) ADDRESSING OF D2D TRANSMISSIONS BY TARGET GEOGRAPHICAL AREA

(71) Applicant: Telefonaktiebolaget LM Ericsson (publ), Stockholm (SE)

(72) Inventors: Congchi Zhang, Shanghai (CN); Jose Angel Leon Calvo, Aachen (DE); Shehzad Ali Ashraf, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 475 days.

(21) Appl. No.: 18/013,410

(22) PCT Filed: Jul. 9, 2020

(86) PCT No.: PCT/EP2020/069467
§ 371 (c)(1),
(2) Date: Dec. 28, 2022

(87) PCT Pub. No.: WO2022/008060
PCT Pub. Date: Jan. 13, 2022

(65) Prior Publication Data
US 2023/0247518 A1 Aug. 3, 2023

(51) Int. Cl.
*H04W 40/20* (2009.01)
(52) U.S. Cl.
CPC ................ *H04W 40/20* (2013.01)
(58) Field of Classification Search
None
See application file for complete search history.

(56) References Cited

U.S. PATENT DOCUMENTS

| 2018/0242190 A1 | 8/2018 | Khoryaev et al. |
| 2020/0100048 A1* | 3/2020 | Wu ........................ H04L 1/1829 |
| 2020/0100167 A1* | 3/2020 | Cheng .................... H04W 4/40 |

FOREIGN PATENT DOCUMENTS

WO 2020060468 A1 3/2020

OTHER PUBLICATIONS

"GeoGrid: A Scalable Location Service Network", 27th International Conference on Distributed Computing Systems (ICDCS'07), IEEE Computer Society, 2007, pp. 1-8.
"3GPP TR 38.885 V16.0.0", 3rd Generation Partnership Project; Technical Specification Group Radio Access Network; NR; Study on NR Vehicle-to-Everything (V2X) (Release 16), Mar. 2019, pp. 1-122.
Lin, Dan, et al., "MoZo: A Moving Zone Based Routing Protocol Using Pure V2V Communication in VANETs", IEEE Transactions on Mobile Computing, vol. 16, No. 5, May 2017, pp. 1357-1370.
(Continued)

*Primary Examiner* — Jenkey Van
(74) *Attorney, Agent, or Firm* — Murphy, Bilak & Homiller, PLLC

(57) ABSTRACT

A wireless communication device obtains configuration information defining multiple geographical areas. Further, the wireless communication device sends an outgoing D2D transmission. The outgoing D2D transmission comprises an area identifier to identify one of the geographical areas as target geographical area of the outgoing D2D transmission and to address the outgoing D2D transmission to one or more wireless communication devices in the identified target geographical area of the outgoing D2D transmission.

24 Claims, 14 Drawing Sheets

(56) References Cited

OTHER PUBLICATIONS

Maihofer, Christian, "A Survey of Geocast Routing Protocols", IEEE Communications, The Electronic Magazine of Original Peer-Reviewed Survey Articles, www.comsoc.org/pubs/surveys, IEEE Communications Suriveys & Tutorials, 2004, pp. 32-42.

Raw, Ram Shringar, et al., "B-MFR Routing Protocol for Vehicular Ad hoc Networks", IEEE, International Conference on Networking and Information Technology, 2010, pp. 420-423.

Yoo, Sang-Jo, et al., "Source-Based Multiple Gateway Selection Routing Protocol in Ad-Hoc Networks", MSN 2006, LNCS 4325, 2006, pp. 107-118.

* cited by examiner

ADDRESSING OF D2D TRANSMISSIONS BY TARGET GEOGRAPHICAL AREA

TECHNICAL FIELD

The present invention relates to methods for controlling device-to-device (D2D) communication and to corresponding devices, systems, and computer programs.

BACKGROUND

Current wireless communication networks, e.g., based on the LTE (Long Term Evolution) or NR technology as specified by 3GPP ($3^{rd}$ Generation Partnership Project), also support D2D communication modes to enable direct communication between UEs (user equipments), sometimes also referred to as sidelink communication. Such D2D communication modes may for example be used for vehicle communications, e.g., including communication between vehicles, between vehicles and roadside communication infrastructure and, possibly, between vehicles and cellular networks. Due to wide range of different types of devices that might be involved in the communication with the vehicles, vehicle-to-everything (V2X) communication is another term used to refer to this class of communication. Vehicle communications have the potential to increase traffic safety, reduce energy consumption and enable new services related to intelligent transportation systems.

Due to the nature of the basic road safety services, LTE V2X functionalities have been designed for broadcast transmissions, i.e., for transmissions where all receivers within a certain range of a transmitter may receive a message from the transmitter, i.e., may be regarded as intended recipients. In fact, the transmitter may not be aware or otherwise be able to control the group of intended receivers. V2X functionalities for the NR technology are for example described in 3GPP TR 38.885 V16.0.0 (2019 March). In the NR technology, also more targeted V2X services are considered, by supporting also groupcast, multicast, or unicast transmissions, in which the intended receiver of a message consists of only a subset of the receivers within a certain range of the transmitter (groupcast) or of a single receiver (unicast). For example, in a platooning service for vehicles there may be certain messages that are only of interest for a member vehicle of the platoon, so that the member vehicles of the platoon can be efficiently targeted by a groupcast transmission. In another example, the see-through functionality, where one vehicle provides video data from a front facing camera to a following vehicle, may involve V2X communication of only a pair of vehicles, for which unicast transmissions may be a preferred choice. Furthermore, NR sidelink communication supports D2D communication of UEs with and without network coverage, with varying degrees of interaction between the UEs and the network, including the possibility of standalone, network-less operation.

For NR sidelink communication, unicast at access stratum is supported for services requiring high reliability. Between the same UE pair, there can be multiple sidelink unicast links and each link can support multiple SL QoS flows/radio bearers, established via a sidelink radio interface, in the NR and LTE technology referred to as "PC5". At the access stratum, each link can be identified by the source and destination Layer 2 identity (L2 ID). FIG. 1A schematically illustrates utilization of multiple sidelink unicast links between two UEs for supporting multiple different services.

The sidelink unicast link can be established by means of a direct discovery procedure. In this procedure, an initiating UE who intends to communicate with a specific UE or another UE supporting a specific service will broadcast a Direct Communication Request message. If a specific target UE is known to the initiating UE, the initiating UE includes a higher layer identifier of the target UE in the Direct Communication Request message. This case is also referred to as "UE oriented Layer-2 link establishment". If the initiating UE would like to discover all UEs in proximity having interest in the same service, the Direct Communication Request message may include a service identifier instead of the identifier of a specific target UE. This is also referred to as "service oriented Layer-2 link establishment". A UE in proximity which receives the Direct Communication Request will respond to the initiating UE only if it is the identified target UE or if it has interest in the identified service. The link is then established after L2 ID exchange and a security setup procedure. FIG. 1B schematically illustrates an example of a procedure for sidelink unicast link establishment, involving UE oriented Layer-2 link establishment and/or service-oriented Layer-2 link establishment.

A further potential use case of D2D communication is NSPS (National Security and Public Safety). In traditional specific NSPS communication systems such as TETRA (Terrestrial Trunked Radio), data rates are in the order of a few kbit/s at most, which is regarded to be not sufficient to support future NSPS use case scenarios. Moreover, the NSPS use case requires enhanced coverage and high reliability of communication. Some scenarios of the NSPS use case also involve operation without support from infrastructure, e.g., NSPS communication in tunnels, inside certain buildings, or in certain emergency situations where the infrastructure is destroyed or non-operative. Even though in some of these situations, cellular coverage could be provided using mobile base stations, e.g., trucks with a portable base station, basing at least a part of NSPS communication on LTE or NR sidelink communication can provide benefits concerning the achievable data rates, robustness, and reliability of operation without network coverage. In the case of NR sidelink communication, also NSPS group communication scenarios can be efficiently addressed, such as communication among a group of workers in a building or at an emergency site. In some scenarios, also utilization of multi-hop wireless connections formed of multiple sidelink unicast links could help to enable communication between devices which are not capable of establishing a direct sidelink unicast connection.

In some public safety scenarios it may occur that a certain message is only valuable to a certain group of UEs located in a certain area. For example, a commander may want to talk to all first responders in a building. Using the existing D2D and sidelink technologies, such targeting of UEs in a certain area can be achieved by addressing the same message by unicast D2D transmissions to each UE which is assumed to be in the area or by groupcast D2D transmissions to groups of UEs which are assumed to be in the area. This typically requires that the same message is transmitted multiple times and also requires information about where the individual UEs or groups are located. Alternatively, the message can be distributed by flooding, i.e., by broadcasting it to all UEs and causing each UE which receives the message to also forward the message to further UEs within the range of the receiving UE. With such flooding, the message is typically also received by UEs belonging to the group of intended recipients, and it may be up to each UE to decide whether and how to use the received message.

However, transmitting the same message multiple times with unicast addressing of individual UEs may result in rather poor resource efficiency. Further, also when using flooding to distribute the message the resource efficiency may be low because it can occur that the message is received or forwarded by an excessive number of UEs not belonging to the group of intended recipients. This may result in excessive duplicated transmissions or in congestion of the network.

Accordingly, there is a need for techniques which allow for efficiently addressing a D2D transmission to multiple target recipients.

SUMMARY

According to an embodiment, a method of controlling D2D communication is provided. According to the method, a wireless communication device obtains configuration information defining multiple geographical areas. Further, the wireless communication device sends an outgoing D2D transmission. The outgoing D2D transmission comprises an area identifier to identify one of the geographical areas as target geographical area of the outgoing D2D transmission and to address the outgoing D2D transmission to one or more wireless communication devices in the identified target geographical area of the outgoing D2D transmission.

According to a further embodiment, a method of controlling D2D communication is provided. According to the method, a wireless communication device obtains configuration information defining multiple geographical areas. Further, the wireless communication device receives an incoming D2D transmission. The incoming D2D transmission comprises an area identifier to identify one of the geographical areas as target geographical area of the incoming D2D transmission and to address the incoming D2D transmission to one or more wireless communication devices in the target geographical area of the incoming D2D transmission. Based on whether the wireless communication device is located in the identified target geographical area of the incoming D2D transmission, the wireless device determines whether it is a target recipient of the incoming D2D transmission.

According to a further embodiment, a method of controlling D2D communication is provided. According to the method, a wireless communication device obtains configuration information defining multiple geographical areas. Further, the wireless communication device receives an incoming D2D transmission. The incoming D2D transmission comprises an area identifier to identify one of the geographical areas as target geographical area of the incoming D2D transmission and to address the incoming D2D transmission to one or more wireless communication devices in the target geographical area of the incoming D2D transmission. In response to the wireless communication device being located in the target geographical area of the incoming D2D transmission, the wireless communication device replaces the area identifier with at least one device identifier and/or at least one group identifier assigned to at least one wireless communication device which is located in the identified target geographical area of the incoming D2D transmission. Further, the wireless communication device sends an outgoing D2D transmission which forwards at least a part of the received incoming D2D transmission with the area identifier being replaced by the at least one device identifier and/or the at least one group identifier.

According to a further embodiment, a wireless communication device is provided. The wireless communication device is configured to obtain configuration information defining multiple geographical areas. Further, the wireless communication device is configured to send an outgoing D2D transmission. The outgoing D2D transmission comprises an area identifier to identify one of the geographical areas as target geographical area of the outgoing D2D transmission and to address the outgoing D2D transmission to one or more wireless communication devices in the identified target geographical area of the outgoing D2D transmission.

According to a further embodiment, a wireless communication device is provided. The wireless communication device comprises at least one processor and a memory. The memory contains instructions executable by said at least one processor, whereby the wireless communication device is operative to obtain configuration information defining multiple geographical areas. Further, the memory contains instructions executable by said at least one processor, whereby the wireless communication device is operative to send an outgoing D2D transmission. The outgoing D2D transmission comprises an area identifier to identify one of the geographical areas as target geographical area of the outgoing D2D transmission and to address the outgoing D2D transmission to one or more wireless communication devices in the identified target geographical area of the outgoing D2D transmission.

According to a further embodiment, a wireless communication device is provided. The wireless communication device is configured to obtain configuration information defining multiple geographical areas. Further, the wireless communication device is configured to receive an incoming D2D transmission. The incoming D2D transmission comprises an area identifier to identify one of the geographical areas as target geographical area of the incoming D2D transmission and to address the incoming D2D transmission to one or more wireless communication devices in the target geographical area of the incoming D2D transmission. Further, the wireless communication device is configured to, based on whether the wireless communication device is located in the identified target geographical area of the incoming D2D transmission, determine whether it is a target recipient of the incoming D2D transmission.

According to a further embodiment, a wireless communication device is provided. The wireless communication device comprises at least one processor and a memory. The memory contains instructions executable by said at least one processor, whereby the wireless communication device is operative to obtain configuration information defining multiple geographical areas. Further, the memory contains instructions executable by said at least one processor, whereby the wireless communication device is operative to receive an incoming D2D transmission. The incoming D2D transmission comprises an area identifier to identify one of the geographical areas as target geographical area of the incoming D2D transmission and to address the incoming D2D transmission to one or more wireless communication devices in the target geographical area of the incoming D2D transmission. Further, the memory contains instructions executable by said at least one processor, whereby the wireless communication device is operative to, based on whether the wireless communication device is located in the identified target geographical area of the incoming D2D transmission, determine whether it is a target recipient of the incoming D2D transmission.

According to a further embodiment, a wireless communication device is provided. The wireless communication device is configured to obtain configuration information defining multiple geographical areas. Further, the wireless communication device is configured to receive an incoming D2D transmission. The incoming D2D transmission comprises an area identifier to identify one of the geographical areas as target geographical area of the incoming D2D transmission and to address the incoming D2D transmission to one or more wireless communication devices in the target geographical area of the incoming D2D transmission. Further, the wireless communication device is configured to, in response to the wireless communication device being located in the target geographical area of the incoming D2D transmission, replace the area identifier with at least one device identifier and/or at least one group identifier assigned to at least one wireless communication device which is located in the identified target geographical area of the incoming D2D transmission. Further, the wireless communication device is configured to send an outgoing D2D transmission which forwards at least a part of the received incoming D2D transmission with the area identifier being replaced by the at least one device identifier and/or the at least one group identifier.

According to a further embodiment, a wireless communication device is provided. The wireless communication device comprises at least one processor and a memory. The memory contains instructions executable by said at least one processor, whereby the wireless communication device is operative to obtain configuration information defining multiple geographical areas. Further, the memory contains instructions executable by said at least one processor, whereby the wireless communication device is operative to receive an incoming D2D transmission. The incoming D2D transmission comprises an area identifier to identify one of the geographical areas as target geographical area of the incoming D2D transmission and to address the incoming D2D transmission to one or more wireless communication devices in the target geographical area of the incoming D2D transmission. Further, the memory contains instructions executable by said at least one processor, whereby the wireless communication device is operative to, in response to the wireless communication device being located in the target geographical area of the incoming D2D transmission, replace the area identifier with at least one device identifier and/or at least one group identifier assigned to at least one wireless communication device which is located in the identified target geographical area of the incoming D2D transmission. Further, the memory contains instructions executable by said at least one processor, whereby the wireless communication device is operative to send an outgoing D2D transmission which forwards at least a part of the received incoming D2D transmission with the area identifier being replaced by the at least one device identifier and/or the at least one group identifier.

According to a further embodiment of the invention, a computer program or computer program product is provided, e.g., in the form of a non-transitory storage medium, which comprises program code to be executed by at least one processor of a wireless communication device. Execution of the program code causes the wireless communication device to obtain configuration information defining multiple geographical areas. Further, execution of the program code causes the wireless communication device to send an outgoing D2D transmission. The outgoing D2D transmission comprises an area identifier to identify one of the geographical areas as target geographical area of the outgoing D2D transmission and to address the outgoing D2D transmission to one or more wireless communication devices in the identified target geographical area of the outgoing D2D transmission.

According to a further embodiment of the invention, a computer program or computer program product is provided, e.g., in the form of a non-transitory storage medium, which comprises program code to be executed by at least one processor of a wireless communication device. Execution of the program code causes the wireless communication device to obtain configuration information defining multiple geographical areas. Further, execution of the program code causes the wireless communication device to receive an incoming D2D transmission. The incoming D2D transmission comprises an area identifier to identify one of the geographical areas as target geographical area of the incoming D2D transmission and to address the incoming D2D transmission to one or more wireless communication devices in the target geographical area of the incoming D2D transmission. Further, execution of the program code causes the wireless communication device to, based on whether the wireless communication device is located in the identified target geographical area of the incoming D2D transmission, determine whether it is a target recipient of the incoming D2D transmission.

According to a further embodiment of the invention, a computer program or computer program product is provided, e.g., in the form of a non-transitory storage medium, which comprises program code to be executed by at least one processor of a wireless communication device. Execution of the program code causes the wireless communication device to obtain configuration information defining multiple geographical areas. Further, execution of the program code causes the wireless communication device to receive an incoming D2D transmission. The incoming D2D transmission comprises an area identifier to identify one of the geographical areas as target geographical area of the incoming D2D transmission and to address the incoming D2D transmission to one or more wireless communication devices in the target geographical area of the incoming D2D transmission. Further, execution of the program code causes the wireless communication device to, in response to the wireless communication device being located in the target geographical area of the incoming D2D transmission, replace the area identifier with at least one device identifier and/or at least one group identifier assigned to at least one wireless communication device which is located in the identified target geographical area of the incoming D2D transmission. Further, execution of the program code causes the wireless communication device to send an outgoing D2D transmission which forwards at least a part of the received incoming D2D transmission with the area identifier being replaced by the at least one device identifier and/or the at least one group identifier.

Details of such embodiments and further embodiments will be apparent from the following detailed description of embodiments.

DETAILED DESCRIPTION OF EMBODIMENTS

Figure 1A:
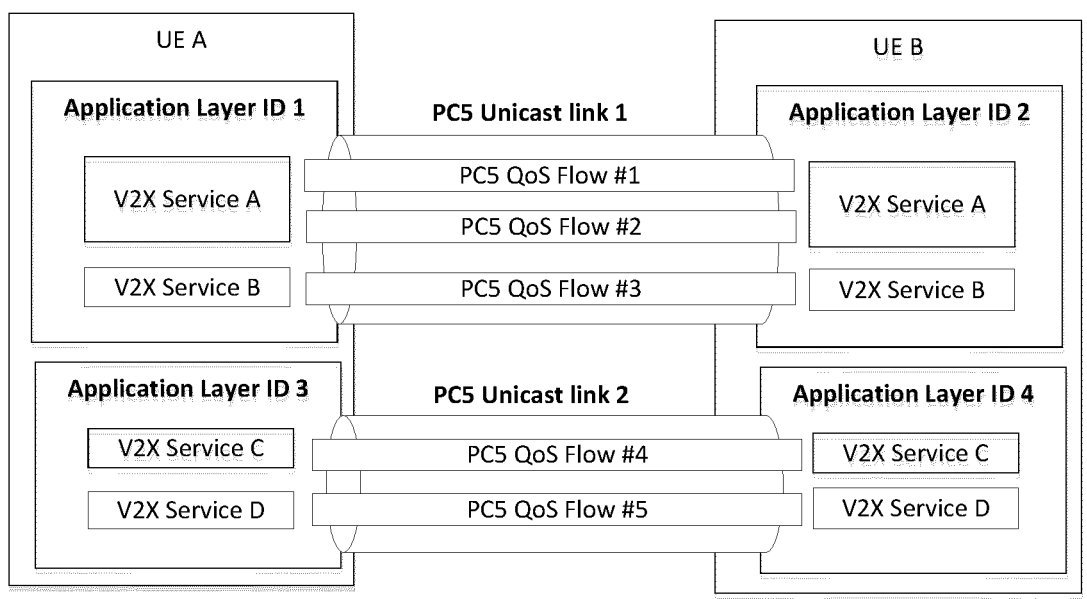
FIG. 1A schematically illustrates utilization of multiple sidelink unicast links for supporting different services.
Figure 1B:
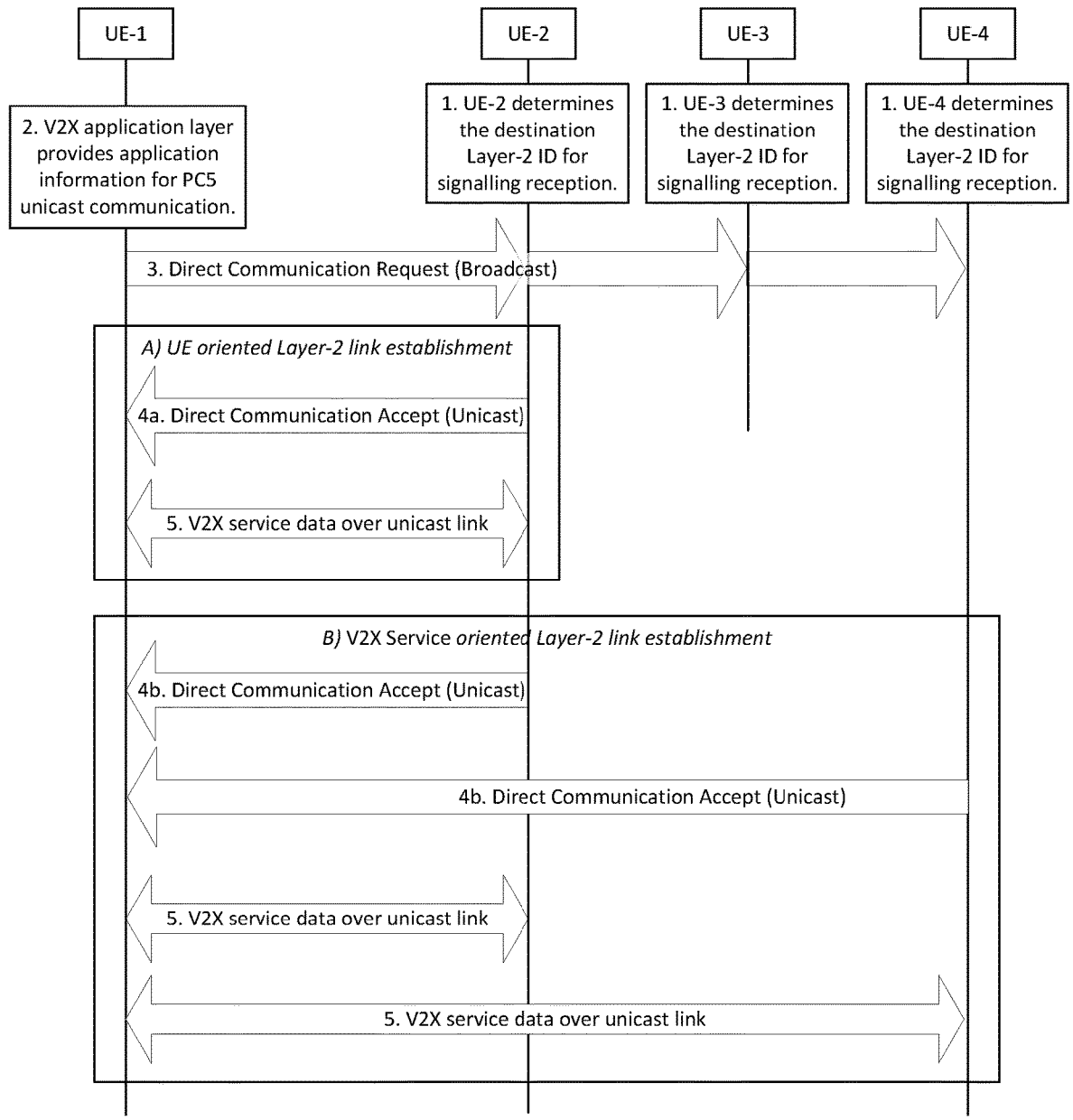
FIG. 1B schematically illustrates a direct discovery procedure for service oriented establishment of sidelink unicast links.

In the following, concepts in accordance with exemplary embodiments of the invention will be explained in more detail and with reference to the accompanying drawings. The illustrated embodiments relate to controlling of D2D communication by wireless communication devices. These wireless communication devices may include various types of UEs or other wireless devices (WDs). As used herein, the term "wireless device" (WD) refers to a device capable, configured, arranged, and/or operable to communicate wirelessly with network nodes and/or other WDs. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, a connected vehicle, etc. In some examples, in an Internet of Things (IoT) scenario, a WD may also represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine-Type Communication (MTC) device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. The illustrated concepts particularly concern WDs that support D2D communication, for example by implementing a 3GPP standard for sidelink communication, Vehicle-to-Vehicle (V2V), Vehicle-to-Infrastructure (V2I), Vehicle-to-Everything (V2X). The D2D communication may for example be based on the LTE radio technology or the NR radio technology as specified by 3GPP, e.g., on the PC5 interface of the LTE or NR technology. However, it is noted that the illustrated concepts could also be applied to other radio technologies, e.g., a WLAN (Wireless Local Area Network) technology.

In the illustrated concepts, multiple geographical areas are defined, e.g., by using RRC (Radio Resource Control), broadcasted SI (SI), and/or network operator preconfiguration. These geographical areas are then used as a basis for addressing D2D transmissions by including an area identifier into the D2D transmission to identify the geographical area the D2D transmission is addressed to. Direct (single-hop) or multi-hop D2D transmissions may be used to convey the D2D transmission to one or more UEs in the target geographical area. Accordingly, a D2D transmission may be conveyed via a direct or single-hop D2D path or via a multi-hop D2D path formed of multiple D2D path segments each corresponding to a direct D2D path.

For enabling efficient propagation of the D2D transmission to other geographical areas, certain UEs may be configured as gateway UE. Here, a gateway UE is a UE that provides a direct D2D path between two adjacent geographical areas. This is achieved by the gateway UE being located in a first geographical area and having a direct D2D connection to another UE in the adjacent second geographical area. This other UE may be regarded as being a counterpart gateway UE. From the perspective of the second geographical area, the counterpart gateway UE may act as a gateway UE to the first geographical area. Using the area identifier for addressing the D2D transmission to a target geographical area may also be referred to as "geocasting" of the D2D transmission. The illustrated concepts thus allow for providing a D2D geocasting mechanism. Here, it is noted that the D2D geocasting mechanism may also be combined with other addressing mechanisms suitable for D2D communication, e.g., by using a groupcasting mechanism to identify a subset of the UEs in the target geographical area.

Figure 2A:
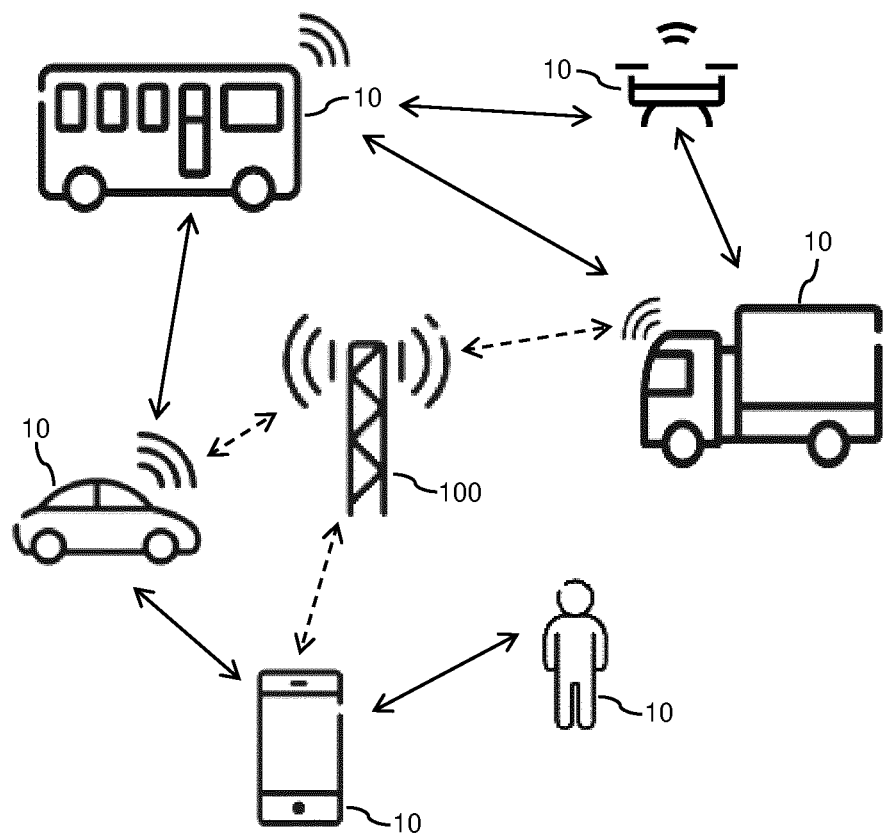
FIG. 2A schematically illustrates an exemplary V2X scenario in which D2D communication may be controlled according to an embodiment of the invention.

FIG. 2A illustrates an exemplary scenario involving V2X communications. In particular, FIG. 2A shows various UEs 10, which may engage in V2X communication or other D2D communication, illustrated by solid arrows. Further, FIG. 2A shows an access node 100 of a wireless communication network, e.g., an eNB of the LTE technology or a gNB of the NR technology, or an access point of a WLAN. At least some of the UEs 10 may also be capable of communicating by using DL radio transmissions and/or UL radio transmissions, illustrated by broken arrows.

The UEs illustrated in FIG. 2A comprise vehicles, a drone, a mobile phone, and a person, e.g., a pedestrian, a cyclist, a driver of a vehicle, or a passenger of a vehicle. Here, it is noted that in the case of the vehicles the radio transmissions may be performed by a communication module installed in the vehicle, and that in the case of the person the radio transmissions may be performed by a radio device carried or worn by the person, e.g., a wristband device or similar wearable device. Furthermore, it is noted that the UEs shown in FIG. 2A are merely exemplary and that in the illustrated concepts other types of V2X communication device or D2D communication device could be utilized as well, e.g., RSUs (roadside units) or other infrastructure based V2X communication devices, V2X communication devices based in an aircraft, like an airplane, or helicopter, in a spacecraft, in a train or car of a train, in a ship, in a motorcycles, in a bicycle, in a mobility scooter, or in any other kind of mobility or transportation device.

In the scenario of FIG. 2A, the UEs 10 may be located in various geographical areas. and the D2D geocasting mechanism may be used to efficiently address the V2X communication to the UEs 10 located in a certain geographical area.

Figure 2B:
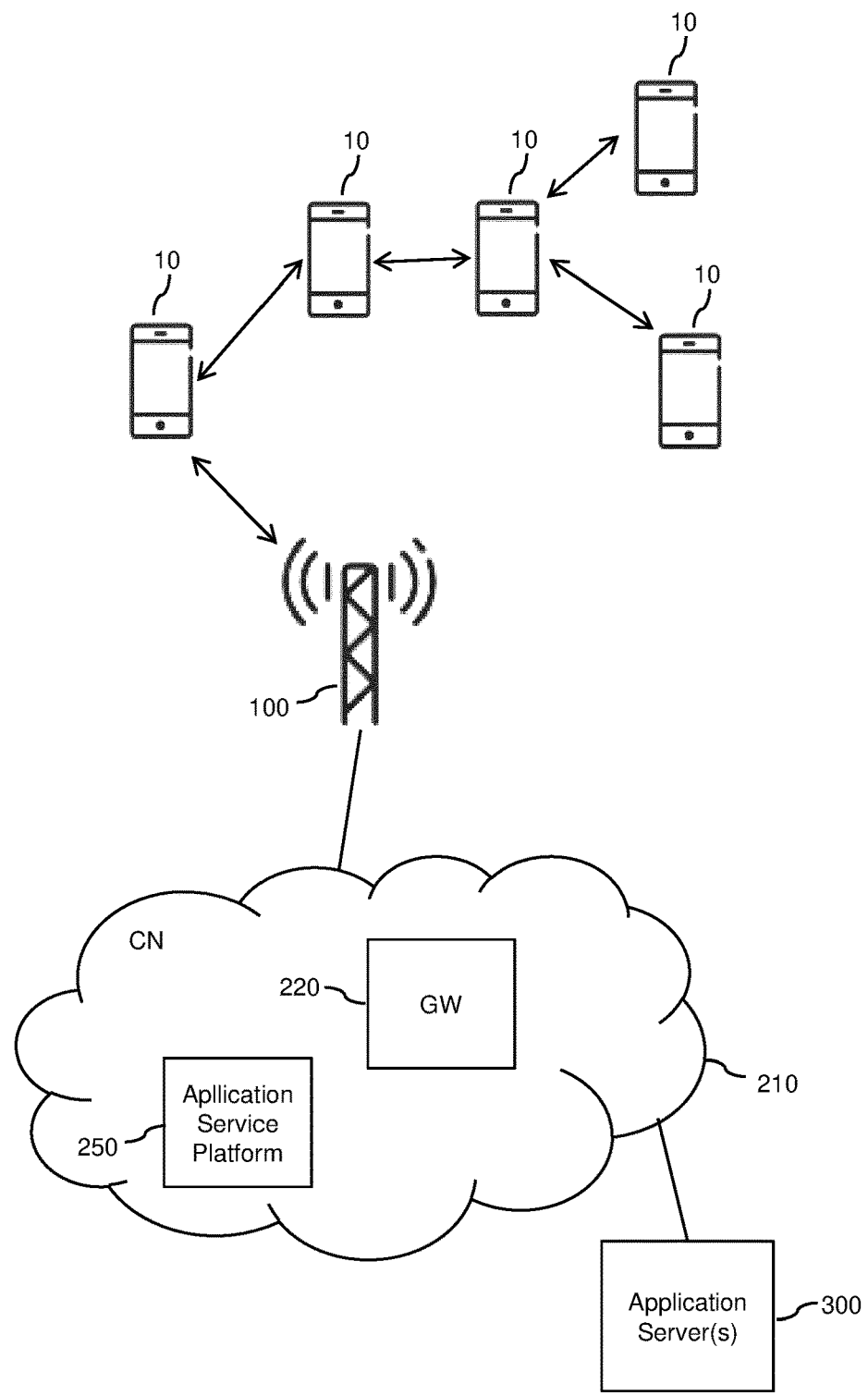
FIG. 2B schematically illustrates an exemplary scenario according to an embodiment of the invention, in which D2D communication may be controlled according to an embodiment of the invention.

FIG. 2B illustrates an exemplary D2D communication scenario. In particular, FIG. 2B shows multiple UEs 10, which are connected to each other by radio links implementing direct wireless links (illustrated by double-headed arrows). Further, one of the UEs 10 is connected by a radio link to an access node 100 of a wireless communication network, e.g., to an eNB of the LTE technology, or a gNB of the NR technology. The access node 100 is part of a RAN (Radio Access Network) of the wireless communication network, which typically also includes further access nodes to provide a desired coverage of the wireless communication network. Further, FIG. 2B shows a core network (CN) 210 of the wireless communication network. The CN 210 may provide connectivity of the UEs 10 to other data networks, e.g., through a GW 220 provided in the CN 210. Further, the CN 210 may also include various nodes for controlling operation of the UEs 10.

The radio links may be used for D2D communication between the UEs 10. Further, the radio link to the wireless communication network may be used for controlling or otherwise assisting the D2D communication. Further, the D2D communication and/or data communication with the wireless communication network may be used for providing various kinds of services to the UEs 10, e.g., a voice service, a multimedia service, a data service, an intelligent transportation system (ITS) or similar vehicular management or coordination service, and/or an NSPS service. Such services may be based on applications which are executed on the UE 10 and/or on a device linked to the UE 10. Accordingly, in the illustrated concepts a D2D transmission may convey or correspond to a V2X message, an ITS message, or some other kind of message related to a service. Further, FIG. 2B illustrates an application service platform 250 in the CN 210 of the wireless communication network. Further, FIG. 2B illustrates one or more application servers 300 provided outside the wireless communication network. The application(s) executed on the UE 10 and/or on one or more other devices linked to the UE 10 may use the radio links with one or more other UEs 10, the application service platform 250, and/or the application server(s) 300, thereby enabling the corresponding service(s) on the UE 10. In some scenarios, the services utilized by the UEs 10 may thus be hosted on the network side, e.g., on the application service platform 250 or on the application server(s) 300. However, some of the services may also network-independent so that they can be utilized without requiring an active data connection to the wireless communication network. This may for example apply to certain V2X or NSPS services. Such services may however still be assisted from the network side while the UE 10 is in coverage of the wireless communication network.

Also in the scenario of FIG. 2B, the UEs 10 may be located in various geographical areas, and the D2D geocasting mechanism of the illustrated concepts may be used to efficiently address the D2D communication to the UEs 10 located in a certain geographical area. In this way, it is for example possible to utilize support the service(s) on the UEs 10 by geocasting based D2D communication.

In the example of FIG. 2B, the UEs 10 are assumed to be a mobile phone and vehicles or vehicle-based communication devices, e.g., a vehicle-mounted or vehicle-integrated communication module, or a smartphone or other user device linked to vehicle systems. However, it is noted that other types of UE could be used as well, e.g., a device carried by a pedestrian, or an infrastructure-based device, such as a roadside unit, like for example illustrated in FIG. 2A.

Figure 3:
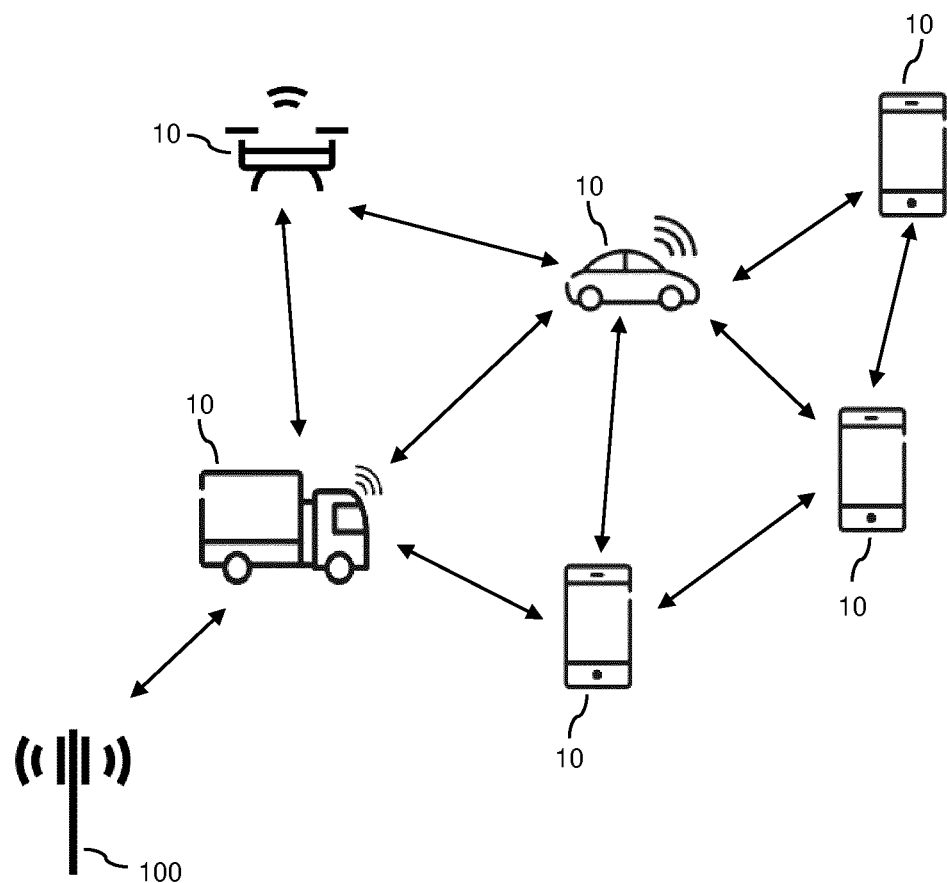
FIG. 3 schematically illustrates an exemplary NSPS communication scenario in which D2D communication may control establishment of a direct wireless link according to an embodiment of the invention.

FIG. 3 schematically illustrates an NSPS communication scenario. In particular, FIG. 3 shows multiple UEs 10, which may exchange NSPS messages associated with one or more NSPS services using D2D communication, e.g., based on the LTE sidelink communication or NR sidelink communication. As further illustrated, the NSPS services may be assisted from the network, by exchanging NSPS messages via access node 100. The NSPS services may for example include group communication of rescue vehicles, rescue personnel or other equipment or personnel of public safety related organizations. Such communication may also involve utilizing the illustrated D2D geocasting mechanism to address an NSPS message by including an area identifier to identify a target geographical area. As a result, the NSPS message may be efficiently conveyed to all UEs or to a subset of the UEs in the target geographical area.

Figure 4:
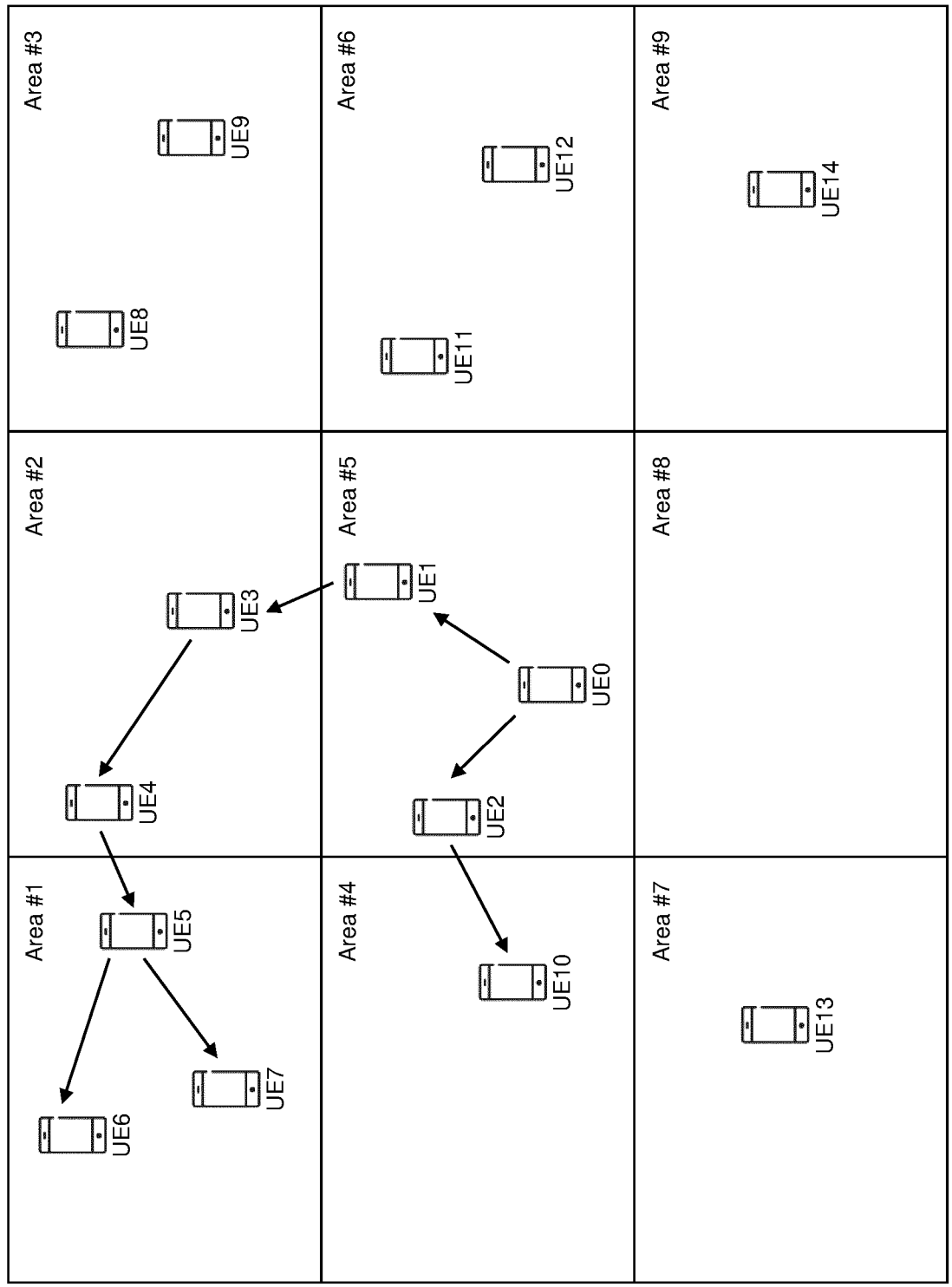
FIG. 4 schematically illustrates an exemplary scenario involving addressing of a D2D transmission to target geographical areas according to an embodiment of the invention.

FIG. 4 shows an example for further illustrating the D2D geocasting mechanism of the illustrated concepts. For this purpose, FIG. 4 illustrates a plurality of geographical areas, denoted as area #1, area #2, area #3, area #4, area #5, area #6, area #7, area #8, and area #9. An area identifier is assigned to each of the geographical areas and may be used to uniquely identify the geographical area. The area identifier may correspond to a numerical value. For example, area #1 may be identified by numerical value 1, area #2 may be identified by numerical value 2, area #3 may be identified by numerical value 3, area #4 may be identified by numerical value 4, area #5 may be identified by numerical value 5, area #6 may be identified by numerical value 6, area #7 may be identified by numerical value 7, area #8 may be identified by numerical value 8, and area #9 may be identified by numerical value 9. As further illustrated, a plurality of UEs may be located in the different geographical areas. In the illustrated example, a first UE (UE0), a second UE (UE1), and a third UE (UE2) are located in area #5. A fourth UE (UE3) and a fifth UE (UE4) are located in area #2. A sixth UE (UE5), a seventh UE (UE6), and an eight UE (UE7) are located in area #1. A ninth UE (UE8) and a tenth UE (UE9) are located in area #3. An eleventh UE (UE10) is located in area #4. A twelfth UE (UE11) and a thirteenth UE (UE12) are located in area #6. An fourteenth UE (UE13) is located in area #7. An fifteenth UE (UE14) is located in area #9. In the illustrated example, area #8 includes no UE.

In the illustrated concepts, the geographical areas may be defined on the basis of a zone configuration as also utilized for controlling radio resource pools for sidelink transmissions. For example, in the case of sidelink transmission as specified by 3GPP for the LTE technology or the NR technology, a zone configuration may be provided to the UE per RRC (Radio Resource Control) configuration, by SI (System Information) configuration, and/or per network operator pre-configuration. The zone configuration may define multiple zones defined in terms of one or more of the following elements: zone length, zone width, total number of zones configured with respect to longitude, and total number of zones configured with respect to latitude. The UE may determine an identity of the zone where it is located, denoted as Zone_id, using the following relations:

$$x1 = \text{Floor}(x/L) \text{Mod } Nx;$$

$$y1 = \text{Floor}(y/W) \text{Mod } Ny;$$

$$\text{Zone\_id} = y1 * Nx + x1.$$

In these relations L denotes a value of the zone length, W denotes a value of the zone width, Nx denotes the total number of zones configured with respect to longitude, Ny denotes the total number of zones configured with respect to latitude, x denotes the geodesic distance in longitude between UE's current location and geographical coordinates (0, 0) according to the WGS84 model, y denotes the geodesic distance in latitude between UE's current location and geographical coordinates (0, 0) according to the WGS84 model. The geographical areas utilized in the illustrated concepts may correspond to these zones or may be defined on the basis of these zones, e.g., by defining each of the geographical areas in terms of a combination of multiple zones.

In the example of FIG. 4, it is assumed that UE0, located in area #5, sends a D2D transmission which is addressed to area #1. Because area #1 is not adjacent to area #5, UE0 first selects area #2 and area #4 as candidates which can be expected to provide a D2D path to the target geographical area, i.e., to area #1. For example, this can be based on the information that each of area #2 and area #4 is adjacent to both area #1 and to area #5. In a first hop, UE0 first sends the D2D transmission to UE1, which acts as a gateway UE to area #2, and to UE2, which acts as a gateway to area #4. In area #2 the first hop D2D transmission is received by UE3. In area #4 the first hop D2D transmission is received by UE10. In a second hop, UE3 sends the D2D transmission to UE4, which acts as a gateway to area #1. In area #1, i.e., in the target area, the second hop D2D transmission is received by UE5. In a third hop, UE5 sends the D2D transmission to the other UEs in the target area, i.e., to UE6 and UE7. Concerning area #4, the illustrated example assumes that the D2D transmission cannot be further propagated to area #1, because area #4 includes no UE acting as a gateway to area #1.

The D2D geocasting mechanism may thus operate as follows: Without limitation, it can be assumed that all UEs are capable of relaying a D2D transmission from the previous hop to the next hop. Further, it can be assumed that all UEs have established connection with the other UEs within its communication range. These other UEs may be in the same geographical area or in an adjacent geographical area.

For supporting the D2D geocasting, each UE may maintain a routing table. The routing tables may be managed on the basis of mutual information exchange between the UEs, e.g., as part of the D2D communication. Accordingly, each UE may learn its routing table from received D2D transmissions. However, it is noted that in some cases management of the routing tables could also be supported from the network side, e.g., based on information provided by one or more nodes of the wireless communication network. Such information could be provided in broadcasted SI or by RRC signaling.

Moreover, it can be assumed that each UE is aware of the geographical area where it is located. For example, each UE may derive its geographical position using the GPS (Global Positioning System) or other satellite positioning system, and/or using a network based positioning mechanism. The geographical position of the UE may then be compared to the definitions of the geographical areas to determine the geographical area where the UE is located. This may for example be accomplished using the above-mentioned relations to derive the Zone_id.

For better illustrating the D2D geocasting mechanism, the following explanations will distinguish between four UE types depending on the role of the UE with respect to the delivery or forwarding of D2D transmission. It is however noted that the assignment of these roles is not fixed and that each UE could also combine the functionalities of two or more of these UE types. These UE types include: An "initial UE" which initially generates a D2D transmission, i.e., is the source of the D2D transmission. An "intermediate UE" which receive a D2D transmission from a previous hop and forwards the D2D transmission to the next hop. A "gateway UE" which keeps a D2D connection to one or more UEs in another geographical area. A "target UE" which is located in the target geographical area and constitutes an intended recipient of the D2D transmission. As mentioned above, the roles may overlap. For example, for a given geocasted D2D transmission, the initial UE could also be a gateway UE. Further, an intermediate UE could also be a gateway UE. Still further, a target UE could also be an intermediate UE and/or a gateway UE.

When an initial UE wants to send a D2D transmission to the UEs in a certain target geographical area, it associates the D2D transmission with an address of the target geographical area. This address will in the following be referred to as area identifier. It may for example correspond to a numerical value, e.g., like the above-mentioned zone identifiers. Associating the D2D transmission with the address is accomplished by incorporating the area identifier into the D2D transmission, e.g., into a packet header or frame header. The initial UE then sends the D2D transmission with the area identifier to a gateway UE which is expected to enable delivery of the D2D transmission to the target geographical area. Sending the D2D transmission to the gateway UE may also be accomplished via one or more intermediate UEs. The D2D transmission is then further relayed by the intermediate and/or gateway UEs until it reaches the target UEs in the target geographical area.

In order to efficiently and reliably enable delivery of the D2D transmission to the target geographical area, the gateway UE provides one or more direct D2D connections to one or more UEs in one or more neighboring geographical areas. The gateway UE may thus facilitate delivery of the D2D transmission towards the target geographical area. Depending on the D2D connections available at a given UE, it can be determined whether this UE should be regarded as a gateway UE: If a UE has a D2D connection to another UE in a different geographical area, it can be regarded as gateway UEs to this geographical area. Information about the context of such gateway UE may be made available to the other UEs in the same geographical area and to the respective counterpart gateway UE(s) in the other geographical area(s). The context of the gateway UE may indicate to which of the geographical areas the gateway UE provides a D2D connection, a channel quality of the D2D connection to the other geographical area, the UE type of the counterpart gateway UEs, the number of counterpart gateway UEs, or the like. In some scenarios, D2D transmissions to and/or from a gateway UE may be assigned a higher priority than other D2D transmissions. This prioritization may for example be provided on access stratum level.

In order to reduce the needed number of transmissions and provide efficient resource utilization, a UE relaying or otherwise transmitting the D2D transmission to other UEs within the same geographical area may use a unicast transmission mode, a groupcast transmission mode, a broadcast transmission mode, or a combination of two or more of these transmission modes.

As mentioned above, each UE may maintain a routing table. The routing table of a given UE may include the following information:

Device identifiers of UEs within the same geographical area that have a D2D connection to this UE. For a given D2D transmission, these UEs may constitute target UEs, intermediate UEs, or gateway UEs.

Device identifiers of UEs within one or more neighboring geographical areas that have a D2D connection to this UE. For a given D2D transmission, these UEs may constitute a gateway UE of the neighboring geographical area.

For each of these UEs, the geographical area where the UE is located, e.g., in terms of the corresponding area identifier.

For each of these UEs, an indication of the UE type, e.g., whether the UE is an intermediate UE, a gateway UE, and/or a target UE.

In some scenarios, the routing table may also include multi-hop information, e.g., defining the number or UE types of the UEs within have a D2D connection to this UE.

Accordingly, if a UE wants to relay or otherwise send a D2D transmission to a different geographical area, it may first select one or more gateway UEs in its own geographical area, which are expected to enable reaching the target geographical area. The UE may then first send the D2D transmission to the identified gateway UE(s). This may be accomplished through a direct D2D connection to the gateway UE. If no such direct D2D connection to the gateway UE is available, sending the D2D transmission to the identified gateway UE may also be accomplished through one or more intermediate UEs. In the example of FIG. 4, UE0 is the initial UE and selects UE1 and UE2 as gateway UEs. UE3 then selects UE4 as a further gateway UE which allows for reaching the target geographical area, i.e., area #1. In some scenarios, the UE may first try to find a gateway UE that has direct D2D connection to the target geographical area. If this is not possible, the UE may try to find gateway UEs that can reach a neighbor geographical area of the target geographical area. For example, in the scenario illustrated in FIG. 4, the target geographical area is area #1. However, for UE0 no gateway UE is available in area #5 that has a direct D2D connection to area #1. Nonetheless, UE0 may determine from its routing table and/or from the configuration information defining the geographical areas that area #2 and area #4 are neighbor geographical areas of area #1. For the latter geographical areas, gateway UEs are available in area #5, namely UE1 and UE2. Accordingly, in the example of FIG. 4, UE0 selects UE1 and UE2 as gateway UEs and first sends its D2D transmission to these gateway UEs. In such situations where multiple gateway UEs are available, the UE may also select among these multiple gateway UEs. For example, the UE may select the gateway UE which provides the shortest path to the target geographical area. This may for example consider an expected number of D2D hops from the gateway UE to the target geographical area and/or an expected number of hops from the UE to the gateway UE.

In some scenarios where multiple gateway UEs are associated with the same neighbor geographical area, only one gateway UE among them may be selected. This selection may be based on channel quality, e.g., measured in terms of RSRP (Reference Signal Received Power) or RSRQ (Reference Signal Received Quality), between the gateway UE and the initial UE. Additionally or alternatively also the channel quality, e.g., measured in terms of RSRP or RSRQ, of at least some or even all other hops to the gateway UE may be considered in the selection. Further, the selection may be based on the length of the D2D path to the target geographical area, e.g., by considering an expected number of D2D hops from the gateway UE to the target geographical area and/or an expected number of hops from the UE to the gateway UE.

In order to deliver the D2D transmission to the selected gateway UE(s), the UE can add an address of the selected gateway UE(s) to the D2D transmission, e.g., by including it in a packet header or frame header. The address may for example correspond to a device identifier. As a result, the D2D transmission may then include the area identifier of the target geographical area and the device identifier of the selected gateway UE(s). The UE may then check its routing table to identify a next hop intermediate UE which allows to reach the selected gateway UE(s). Next, the UE may then send the D2D transmission to the selected next hop intermediate UE. In some scenarios, the UE may also directly send the D2D transmission to the selected gateway UE(s), i.e., if a direct D2D connection to the selected gateway UE is available. If multiple gateway UEs are selected, the D2D transmission may be replicated to be sent separately to each of the multiple gateway UEs.

If an intermediate UE receives a D2D transmission from the previous hop, it may check the indicated address of gateway UE(s) and check its routing table to identify a next hop intermediate UE which allows to reach the selected gateway UE(s). The intermediate UE may then relay the D2D transmission to the selected next hop intermediate UE. In some scenarios, the intermediate UE may also directly send the D2D transmission to the selected gateway UE(s), i.e., if a direct D2D connection to the selected gateway UE is available.

In some scenarios, the above operations of sending or relaying a D2D transmission to one or more selected gateway UEs may involve that the UE generates a MAC PDU (Medium Access Control Packet Data Unit) which includes the address of the selected gateway UE and the address of the selected next hop intermediate UE in its packet header. The UE may then send this MAC PDU to the selected next hop intermediate UE. In some scenarios, the UE may also directly send the MAC PDU to the selected gateway UE(s), i.e., if a direct D2D connection to the selected gateway UE is available. In this case, the packet header of the MAC PDU would not include an address of a next hop intermediate UE. If multiple gateway UEs are selected, the same data may be sent to each of the multiple gateway UEs in separate MAC PDUs.

If the gateway UE receives the D2D transmission, it may select one or more counterpart gateway UEs in its neighbor geographical area. Specifically, it may select those counterpart gateway UEs which are expected to allow reaching the target geographical area. The gateway UE may then send the D2D transmission to the selected counterpart gateway UE(s). In some scenarios, if multiple counterpart gateway UEs are selected, the gateway UE may replicate the D2D transmission to be sent separately to each of the multiple counterpart gateway UEs, e.g., as separate MAC PDUs.

In some scenarios, it may occur that the counterpart gateway UE receives the D2D transmission from the neighboring geographical area and finds that the D2D transmission is to be delivered to yet another geographical area, i.e., that the target geographical area is different from the geographical area where the counterpart UE is located. The counterpart gateway UE may then operate in a similar manner as described above for selecting one or more further gateway UEs which are expected to allow reaching the target geographical area. For example, in the scenario of FIG. 4, when UE1 receives the D2D transmission from UE0, UE1 is a gateway UE to area #2 and relays the D2D transmission to UE3, which is a counterpart gateway UE in area #2. Next, UE3 then proceeds by identifying a further gateway UE which allows for reaching the target area, i.e., area #1, and selects UE4 that has a direct D2D connection to area #1. UE3 then relays the D2D transmission to UE4.

Once the D2D transmission arrives at the target geographical area, the D2D transmission is delivered to the target UEs within the target geographical area. This may involve distributing the D2D transmission to all UEs in the target geographical area. Alternatively, the D2D transmission could be delivered to only a subset of the UEs in the target geographical area, i.e., the target UEs may be only a subset of the UEs in the target geographical area. Here, it is to be noted that in some scenarios the D2D transmission will arrive at a gateway UE of the target geographical area, from a neighboring geographical area. In other scenarios, the initial UE could already be located in the target geographical area. In this case, arrival of the D2D transmission at the target geographical area would already occur when the initial UE generates the D2D transmission.

Within the target geographical area, delivering the D2D transmission to the target UEs may involve that the gateway UE floods the D2D transmission into a sub-network consisting of all the target UEs within the target geographical area. Similarly, if the initial UE is already located in the target geographical area, the initial UE could flood the D2D transmission into a sub-network consisting of all the target UEs within the target geographical area.

Alternatively or in addition, the gateway UE or initial UE could check its routing table and replicate the D2D transmission to be sent separately to each of the target UEs, e.g., as separate MAC PDUs. This may involve adding a respective device address of the target UE to the D2D transmission. In some scenarios, this may also involve replacing the area identifier of the target geographical area with the respective device address.

Alternatively or in addition, the gateway UE or initial UE could check its routing table and groupcast the D2D transmission to at least some of the target UEs. This may involve adding a respective group address assigned to some of the target UEs to the D2D transmission. In this case, the same MAC PDU could be decoded by the target UEs of the group addressed by the groupcast transmission. In some scenarios, this may also involve replacing the area identifier of the target geographical area with the respective group address.

In some scenarios, a target UE may receive the D2D transmission and resend the received D2D transmission to ensure that the D2D transmission can reach all target UEs within the target geographical area, including those UEs which are not within communication range of the gateway UE or initial UE at which the D2D transmission arrives in the target geographical area. The target UE may resend the packet using unicast transmission mode, using a groupcast transmission mode, using in a broadcast transmission mode, or using a combination of two or more of these transmission modes. The target UE may resend the D2D transmission in response to at least one of the following conditions being met:

The target UE did not receive the same D2D transmission before.

The signal power from the source of the D2D transmission is below a threshold value.

The target UE has a direct or multi-hop D2D connection to other target UEs in the target geographical area (by unicast or groupcast), and these other target UEs do not have a D2D connection to the UE from where the D2D transmission was received.

Figure 5:
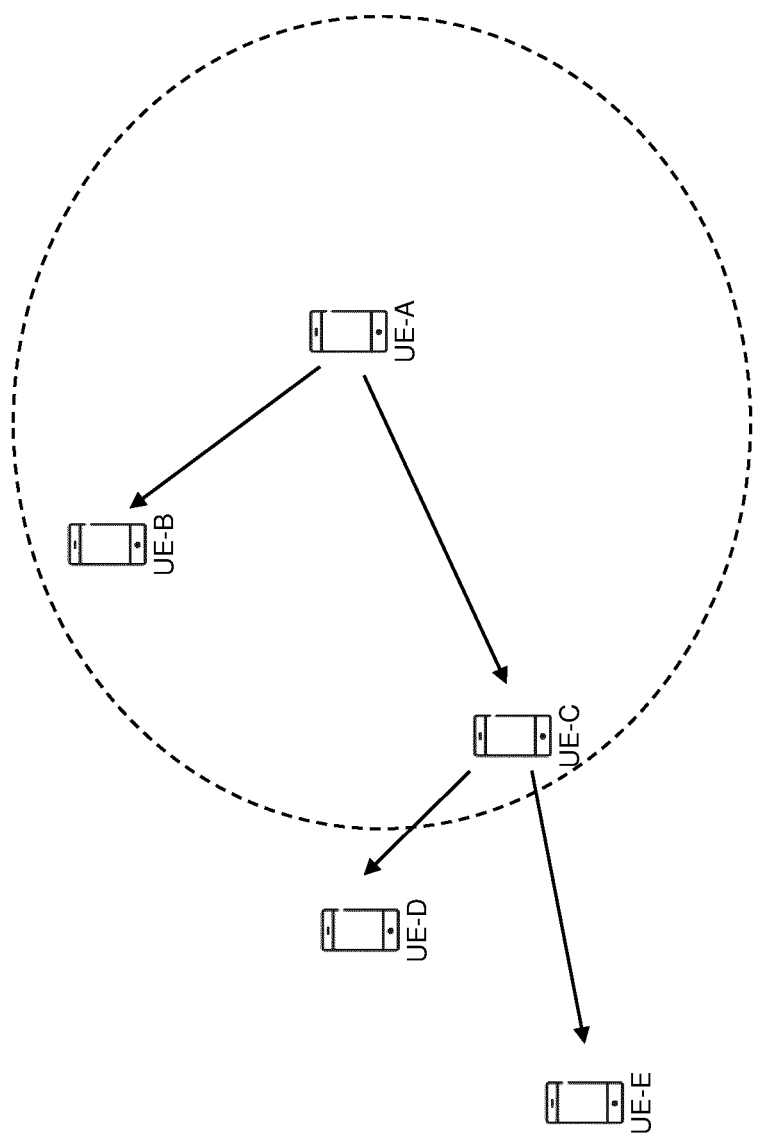
FIG. 5 schematically illustrates an exemplary scenario for illustrating handling of a D2D transmission within a target geographical area according to an embodiment of the invention.

FIG. 5 shows an example of delivering the D2D transmission in the target geographical area. In the example of FIG. 5, UE-A sends a D2D transmission in a groupcast transmission mode, with the D2D transmission being addresses to UE-B, UE-C, UE-D, and UE-E. The communication range from UE-A is illustrated by a broken line. As can be seen, the transmission from UE-A can directly reach UE-B and UE-C, but cannot directly reach UE-D and UE-E. By measuring the RSRP from UE-A, UE-C can determine that it is located at the edge of UE-A's communication range. Further, based on RSRP measurements with respect to UE-D and UE-E, UE-C can estimate that these UEs can be reached from UE-C, but not from UE-A. UE-C can thus decide to resend the D2D transmission received from UE-A towards UE-D and UE-E. This can be accomplished in a unicast transmission mode, which targets UE-D and UE-E by two separate D2D transmissions, or in a groupcast transmission mode which targets UE-D and UE-E by a single D2D transmission which decodable by both UEs.

Figure 6:
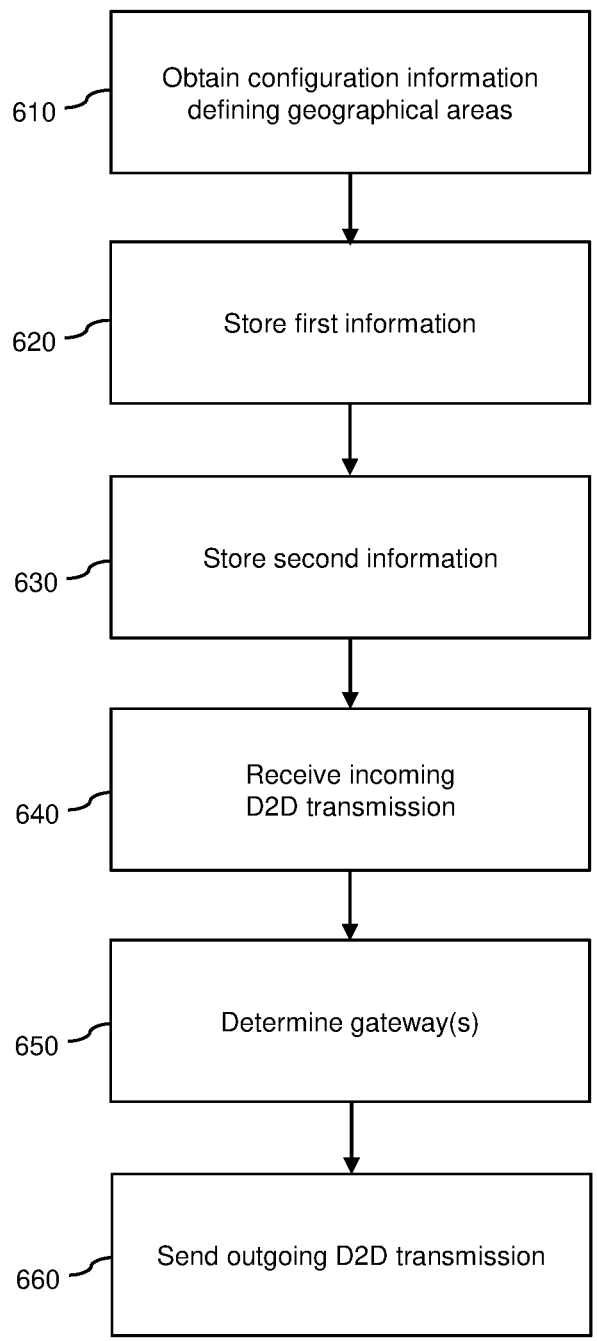
FIG. 6 shows a flowchart for schematically illustrating a method according to an embodiment of the invention.

FIG. 6 shows a flowchart for illustrating a method, which may be utilized for implementing the illustrated concepts. The method of FIG. 6 may be used for implementing the illustrated concepts in a wireless communication device, e.g., corresponding to any of the above-mentioned UEs. In some scenarios, the wireless communication device may be a vehicle or vehicle-mounted device, but other types of WD, e.g., as mentioned above, could be used as well.

If a processor-based implementation of the wireless communication device is used, at least some of the steps of the method of FIG. 6 may be performed and/or controlled by one or more processors of the wireless communication device. Such wireless communication device may also include a memory storing program code for implementing at least some of the below described functionalities or steps of the method of FIG. 6.

At step 610, the wireless communication device obtains configuration information defining multiple geographical areas. The wireless communication device may receive at least a part of the configuration information by RRC signaling while the wireless communication device is connected to a wireless communication network. Alternatively or in addition, the wireless communication device may receive at least a part of the configuration information by broadcasted system information while the wireless communication device is in coverage of a wireless communication network. Alternatively or in addition, the wireless communication device may receive at least a part of the configuration information by operator preconfiguration. The geographical areas may for example be defined in terms of longitude, latitude, width along the latitude direction, and/or length along the longitude direction. In some scenarios the geographical areas may be defined based on zones as also used for resource assignment for D2D transmissions, e.g., as used for allocating resource pools in the sidelink mode of the LTE or NR technology.

At step 620, the wireless communication device may store first information. The first information may be part of the above-mentioned routing tables. In particular, for each of one or more second geographical areas which are adjacent to a first geographical area where the wireless communication device is located, the wireless communication device may store first information indicating one or more wireless communication devices located in the first geographical area and providing a direct D2D path to the second geographical area. The wireless communication device may store the first information based on one or more incoming D2D transmissions received from other wireless communication devices in the first geographical area. Accordingly, the wireless communication device may learn the first information from received D2D transmissions.

At step 630, the wireless communication device may store second information. The second information may be part of the above-mentioned routing tables. The second information may overlap with the first information stored at step 620. The second information may indicate one or more other wireless communication devices connected by a direct D2D path to the wireless communication device. These wireless communication devices may include wireless communication devices located in the same geographical area as the wireless communication device and wireless communication devices located in one or more adjacent geographical areas. The wireless communication device may store the second information based on one or more incoming D2D transmissions received from other wireless communication devices. Accordingly, the wireless communication device may learn the second information from received D2D transmissions.

In some scenarios, the second information may include a device identifier of each of the one or more other wireless communication devices. Further, the second information may include, for each of the one or more other wireless communication devices, an area identifier of the geographical area where the other wireless communication device is located. Further, the second information may indicate, for each of the one or more other wireless communication devices, further wireless communication devices connected by a D2D path to the wireless communication device. The second information may thus indicate multi-hop information which allows for determining which other wireless communication devices could be reached through the other wireless communication device. Further, the second information may indicate, for each of the one or more other wireless communication devices, whether the other wireless communication device provides a direct D2D path between a first geographical area, where the other wireless communication device is located, and at least one second geographical area which is adjacent to the first geographical area, i.e., whether the other wireless communication device is a gateway.

At step 640, the wireless communication device may receive an incoming D2D transmission. The incoming D2D transmission may include an area identifier to identify one of the geographical areas as target geographical area of the incoming D2D transmission and to address the incoming D2D transmission to one or more wireless communication devices in the identified target geographical area of the incoming D2D transmission. The wireless communication device may receive the incoming D2D transmission via one or more multi-hop D2D paths each formed by one or more intermediate wireless communication devices forwarding the D2D transmission from one D2D path segment to a next D2D path segment. Each of these one or more multi-hop D2D paths may include one of the one or more wireless communication devices providing a direct D2D path between two geographical areas, i.e., gateways.

In some scenarios, the incoming D2D transmission may include multiple area identifiers to identify two or more of the geographical areas as target geographical areas of the incoming D2D transmission and to address the incoming D2D transmission to one or more wireless communication devices in the identified target geographical areas of the incoming D2D transmission.

Based on the geographical area where the wireless communication device is located and the identified target geographical area of the received incoming D2D transmission, the wireless communication device may then determine whether it is a target recipient of the received incoming D2D transmission. For this purpose, the wireless communication device may also determine its own geographical position, e.g., based on satellite positioning measurements, network based positioning measurements, and/or other positioning mechanisms.

In some scenarios, the incoming D2D transmission may also include additional address information to address the incoming D2D transmission to a subset of the wireless communication devices in the target geographical area of the incoming D2D transmission. In such cases, the wireless communication device may further consider the additional address information when determining whether it is a target recipient of the D2D transmission.

At step 650, in response to the wireless communication device being located in a first one of the geographical areas and the target geographical area of the outgoing D2D transmission being different from the first geographical area, the wireless communication device determines one or more gateways, i.e., wireless communication devices located in the first geographical area and providing a direct D2D path to at least one second geographical area, which is adjacent to the first geographical area and is expected to provide a D2D path to the target geographical area. The wireless communication device may determine the one or more gateways based on the first information stored at step 620.

In response to determining multiple gateways to the at least one second geographical area, the wireless communication device may select at least one of the multiple gateways. For example, for each of the multiple gateways, the wireless device may determine a respective number of D2D path segments to a target geographical area of an outgoing D2D transmission and select the at least of the multiple gateways based on the determined numbers of D2D path segments to the target geographical area of the outgoing D2D transmission. For example, the wireless communication device may select the gateway providing the lowest number of path segments, to thereby keep the resulting multi-hop D2D path as short as possible. Further, for each of the multiple gateways to the at least one second geographical area, the wireless device may determine a respective number of D2D path segments from the wireless communication device to the gateway and select the at least one of the gateways based on the determined numbers of D2D path segments from the wireless device to the gateway. For example, the wireless communication device may select the gateway providing the lowest number of path segments, to thereby keep the resulting multi-hop D2D path as short as possible. Further, for each of the multiple gateways, the wireless device may determine a respective channel quality of at least one D2D path segment between the wireless communication device and the gateway, e.g., in terms of an RSRP or RSRQ, and select the at least of the multiple gateways based on the determined channel qualities. For example, the wireless communication device may select the gateway providing higher channel qualities, to thereby overall channel quality of the resulting multi-hop D2D path as high as possible. In some scenarios, the selection may also be based on the channel qualities of all D2D path segments between the wireless communication device and the gateway. In some scenarios the wireless communication device may also select at least two of the multiple gateways.

At step 660, the wireless communication device sends an outgoing D2D transmission comprising an area identifier to identify one of the geographical areas as target geographical area of the outgoing D2D transmission and to address the outgoing D2D transmission to one or more wireless communication devices in the identified target geographical area of the outgoing D2D transmission.

The wireless communication device may send the outgoing D2D transmission via one or more multi-hop D2D paths each formed by one or more intermediate wireless communication devices forwarding the D2D transmission from one D2D path segment to a next D2D path segment. Each of these one or more multi-hop D2D paths may include one of the one or more wireless communication devices providing a direct D2D path to at least one second geographical area, i.e., gateways, as determined or selected at step 650. In some scenarios, each of the one or more multi-hop D2D paths may include a further wireless communication device located in the at least one second geographical area and providing a direct D2D path to the first geographical area, i.e., a counterpart gateway in the second geographical area.

The wireless communication device may control the sending of the outgoing D2D transmission based on the second information stored at step 630. This may for example involve selecting an output D2D path or selecting a unicast transmission mode, groupcast transmission mode, and/or broadcast transmission mode.

If at step 640 the wireless communication device received an incoming D2D transmission, step 660 may also involve that the wireless communication device forwards at least a part of the received incoming D2D transmission in the outgoing D2D transmission. In this case, the area identifier of the outgoing D2D transmission may correspond to the area identifier of the received incoming D2D transmission.

In some scenarios, the wireless communication device may decide whether to forward the incoming D2D transmission based on at least one of the following conditions being met:
The wireless communication device did not receive the same D2D transmission before.
The signal power from the source of the D2D transmission is below a threshold value.
The wireless communication device has a direct or multi-hop D2D connection to other wireless communication devices in the target geographical area and these other wireless communication devices do not have a direct D2D path to the wireless communication device from where the incoming D2D transmission was received at step 640.

If at step 640 the wireless communication device received an incoming D2D transmission, step 660 may also involve that, in response to the wireless communication device being located in the target geographical area of the incoming D2D transmission, the wireless communication device adds to the outgoing D2D transmission at least one device identifier and/or group identifier assigned to at least one wireless communication device which is located in the target geographical area.

In some scenarios, the outgoing D2D transmission comprises a respective device identifier for each of the one or more gateways determined at step 650.

If at step 650 the wireless communication device selected two or more gateways, step 660 may involve that the wireless communication device sends the D2D transmission via the multi-hop D2D paths including the selected gateways. In this way, the D2D transmission may be sent in a redundant manner, thereby improving chances of successfully reaching the target geographical area.

In some scenarios, the outgoing D2D transmission may be addressed to all wireless communication devices in the target geographical area of the outgoing D2D transmission. Alternatively, the outgoing D2D may include additional address information to address the outgoing D2D transmission to a subset of the wireless communication devices in the target geographical area of the outgoing D2D transmission.

In response to the wireless communication device providing a direct D2D path between two of the geographical areas, i.e., being a gateway, the wireless communication device may prioritize the outgoing D2D transmission over one or more other D2D transmissions.

In some scenarios, the outgoing D2D transmission may include multiple area identifiers to identify two or more of the geographical areas as target geographical areas of the outgoing D2D transmission and to address the outgoing D2D transmission to one or more wireless communication devices in the identified target geographical areas of the outgoing D2D transmission.

Figure 7:
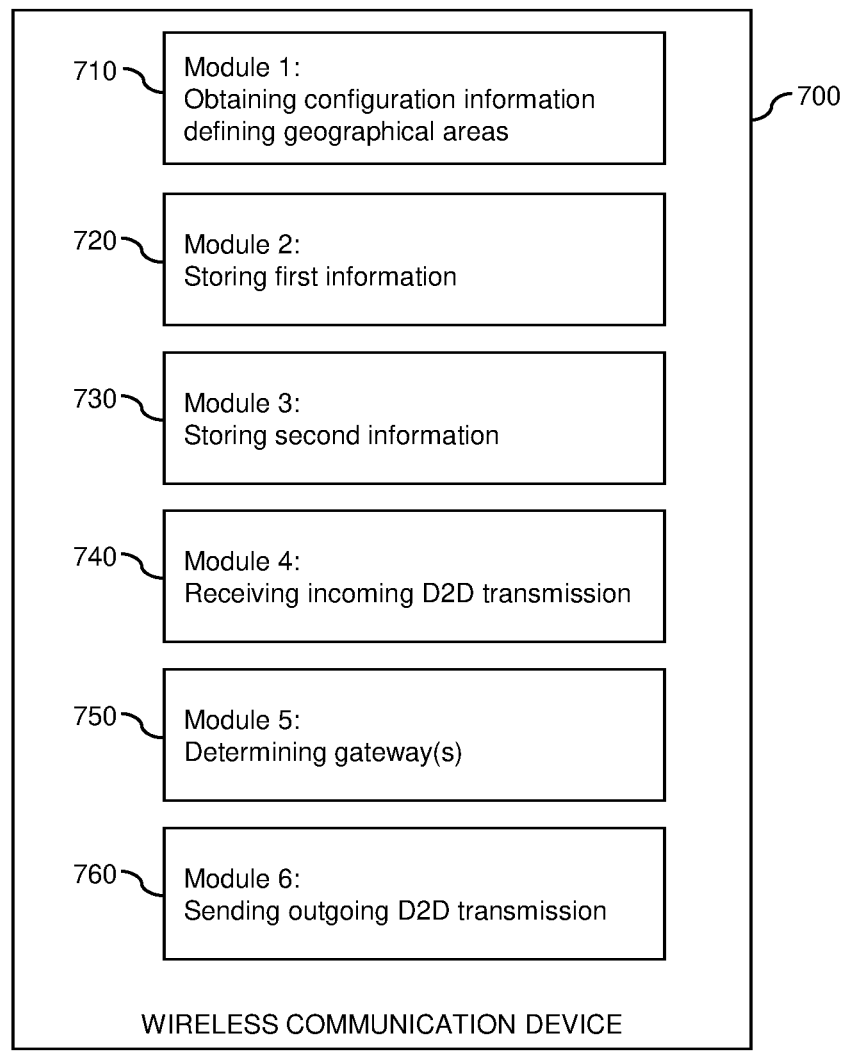
FIG. 7 shows an exemplary block diagram for illustrating functionalities of a wireless communication device implementing functionalities corresponding to the method of FIG. 6.

FIG. 7 shows a block diagram for illustrating functionalities of a wireless communication device 700 which operates according to the method of FIG. 6. The wireless communication device 700 may for example correspond to any of the above-mentioned UEs. As illustrated, the wireless communication device 700 may be provided with a module 710 configured to obtain configuration information defining geographical areas, such as explained in connection with step 610. Further, the wireless communication device 700 device may be provided with a module 720 configured to store first information, such as explained in connection with step 620. Further, the wireless communication device 700 may be provided with a module 730 configured to store second information, such as explained in connection with step 630. Further, the wireless communication device 700 may be provided with a module 740 configured to receive an incoming D2D transmission, such as explained in connection with step 640. Further, the wireless communication device 700 may be provided with a module 750 configured to determine one or more gateways, such as explained in connection with step 650. Further, the wireless communication device 700 may be provided with a module 760 configured to send an outgoing D2D transmission, such as explained in connection with step 660.

It is noted that the wireless communication device 700 may include further modules for implementing other functionalities, such as known functionalities of a UE in the LTE and/or NR radio technology. Further, it is noted that the modules of the wireless communication device 700 do not necessarily represent a hardware structure of the wireless communication device 700, but may also correspond to functional elements, e.g., implemented by hardware, software, or a combination thereof.

Figure 8:
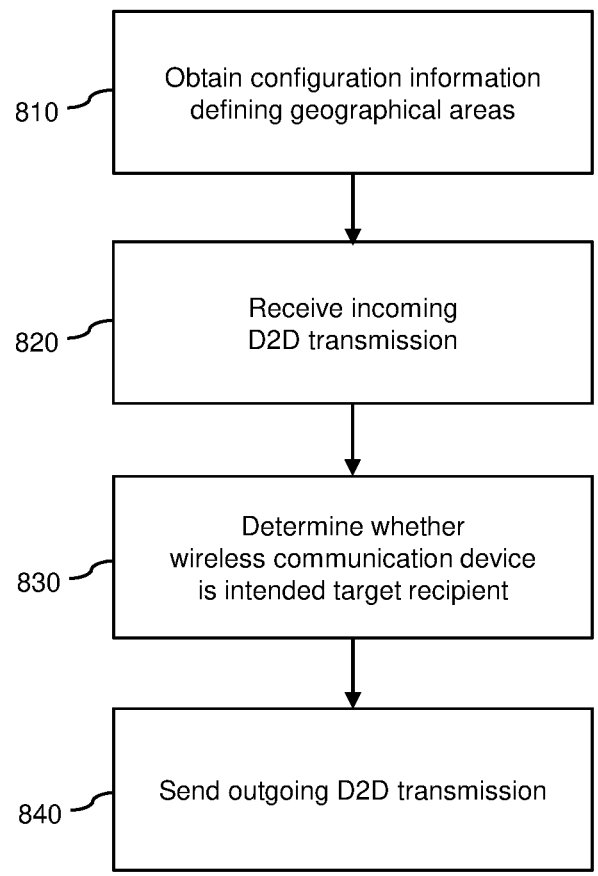
FIG. 8 shows a flowchart for schematically illustrating a further method according to an embodiment of the invention.

FIG. 8 shows a flowchart for illustrating a method, which may be utilized for implementing the illustrated concepts. The method of FIG. 8 may be used for implementing the illustrated concepts in a wireless communication device, e.g., corresponding to any of the above-mentioned UEs. In some scenarios, the wireless communication device may be a vehicle or vehicle-mounted device, but other types of WD, e.g., as mentioned above, could be used as well.

If a processor-based implementation of the wireless communication device is used, at least some of the steps of the method of FIG. 8 may be performed and/or controlled by one or more processors of the wireless communication device. Such wireless communication device may also include a memory storing program code for implementing at least some of the below described functionalities or steps of the method of FIG. 8.

At step 810, the wireless communication device obtains configuration information defining multiple geographical areas. The wireless communication device may receive at least a part of the configuration information by RRC signaling while the wireless communication device is connected to a wireless communication network. Alternatively or in addition, the wireless communication device may receive at least a part of the configuration information by broadcasted system information while the wireless communication device is in coverage of a wireless communication network. Alternatively or in addition, the wireless communication device may receive at least a part of the configuration information by operator preconfiguration. The geographical areas may for example be defined in terms of longitude, latitude, width along the latitude direction, and/or length along the longitude direction. In some scenarios the geographical areas may be defined based on zones as also used for resource assignment for D2D transmissions, e.g., as used for allocating resource pools in the sidelink mode of the LTE or NR technology.

At step 820, the wireless communication device receives an incoming D2D transmission. The incoming D2D transmission includes an area identifier to identify one of the geographical areas as target geographical area of the incoming D2D transmission and to address the incoming D2D transmission to one or more wireless communication devices in the identified target geographical area of the incoming D2D transmission.

The wireless communication device may receive the incoming D2D transmission via one or more multi-hop D2D paths each formed by one or more intermediate wireless communication devices forwarding the D2D transmission from one D2D path segment to a next D2D path segment. Each of these one or more multi-hop D2D paths may include one of the one or more wireless communication devices providing a direct D2D path between two geographical areas, i.e., gateways.

In some scenarios, the incoming D2D transmission may include multiple area identifiers to identify two or more of the geographical areas as target geographical areas of the incoming D2D transmission and to address the incoming D2D transmission to one or more wireless communication devices in the identified target geographical areas of the incoming D2D transmission.

At step 830, the wireless communication device determines based on the geographical area where the wireless communication device is located and the identified target geographical area of the received incoming D2D transmission, whether the wireless communication device is a target recipient of the received incoming D2D transmission. For this purpose, the wireless communication device may also determine its own geographical position, e.g., based on satellite positioning measurements, network based positioning measurements, and/or other positioning mechanisms.

In some scenarios, the incoming D2D transmission may also include additional address information to address the incoming D2D transmission to a subset of the wireless communication devices in the target geographical area of the incoming D2D transmission. In such cases, the wireless communication device may further consider the additional address information when determining whether it is a target recipient of the D2D transmission.

At step 840, the wireless communication device may send an outgoing D2D transmission. The outgoing D2D transmission may include an area identifier to identify one of the geographical areas as target geographical area of the outgoing D2D transmission and to address the outgoing D2D transmission to one or more wireless communication devices in the identified target geographical area of the outgoing D2D transmission.

The wireless communication device may send the outgoing D2D transmission via one or more multi-hop D2D paths each formed by one or more intermediate wireless communication devices forwarding the D2D transmission from one D2D path segment to a next D2D path segment. Each of these one or more multi-hop D2D paths may include one or more wireless communication devices providing a direct D2D path between two of the geographical areas, i.e., gateways. Such gateways may be determined and selected in a similar manner as explained in connection with step 650 of FIG. 6.

The wireless communication device may control the sending of the outgoing D2D transmission based on various information stored by the wireless communication device. Controlling sending of the outgoing D2D transmission may for example involve selecting an output D2D path or selecting a unicast transmission mode, groupcast transmission mode, and/or broadcast transmission mode.

The information used for controlling sending of the outgoing D2D transmission may be part of the above-mentioned routing tables. The information may for example indicate one or more other wireless communication devices connected by a direct D2D path to the wireless communication device. These wireless communication devices may include wireless communication devices located in the same geographical area as the wireless communication device and wireless communication devices located in one or more adjacent geographical areas. The wireless communication device may store the second information based on one or more incoming D2D transmissions received from other wireless communication devices.

In some scenarios, the information may include a device identifier of each of the one or more other wireless communication devices. Further, the information may include, for each of the one or more other wireless communication devices, an area identifier of the geographical area where the other wireless communication device is located. Further, the information may indicate, for each of the one or more other wireless communication devices, further wireless communication devices connected by a D2D path to the wireless communication device. The second information may thus indicate multi-hop information which allows for determining which other wireless communication devices could be reached through the other wireless communication device. Further, the second information may indicate, for each of the one or more other wireless communication devices, whether the other wireless communication device provides a direct D2D path between a first geographical area, where the wireless communication device is located, and at least one second geographical area which is adjacent to the first geographical area, i.e., whether the other wireless communication device is a gateway.

In some scenarios, step 840 may also involve that the wireless communication device forwards at least a part of the received incoming D2D transmission in the outgoing D2D transmission. In this case, the area identifier of the outgoing D2D transmission may correspond to the area identifier of the received incoming D2D transmission.

In some scenarios, the wireless communication device may decide whether to forward the incoming D2D transmission based on at least one of the following conditions being met:

The wireless communication device did not receive the same D2D transmission before.

The signal power from the source of the D2D transmission is below a threshold value.

The wireless communication device has a direct or multi-hop D2D connection to other wireless communication devices in the target geographical area and these other wireless communication devices do not have a direct D2D path to the wireless communication device from where the incoming D2D transmission was received at step 820.

In some scenarios, step 840 may also involve that, in response to the wireless communication device being located in the target geographical area of the incoming D2D transmission, the wireless communication device adds to the outgoing D2D transmission at least one device identifier and/or group identifier assigned to at least one wireless communication device which is located in the target geographical area.

In some scenarios, the outgoing D2D transmission comprises a respective device identifier for each of the one or more gateways to be used for forwarding the D2D transmission to another geographical area.

In some scenarios, the outgoing D2D transmission may include multiple area identifiers to identify two or more of the geographical areas as target geographical areas of the outgoing D2D transmission and to address the outgoing D2D transmission to one or more wireless communication devices in the identified target geographical areas of the outgoing D2D transmission.

Figure 9:
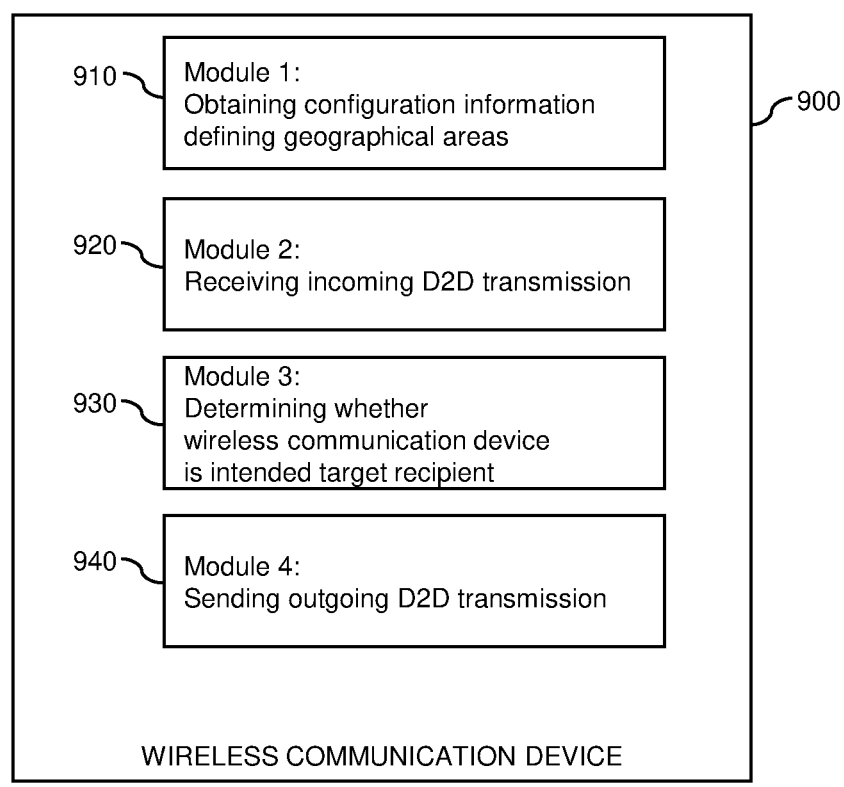
FIG. 9 shows an exemplary block diagram for illustrating functionalities of a wireless communication device implementing functionalities corresponding to the method of FIG. 8.

FIG. 9 shows a block diagram for illustrating functionalities of a wireless communication device 900 which operates according to the method of FIG. 8. The wireless communication device 900 may for example correspond to any of the above-mentioned UEs. As illustrated, the wireless communication device 900 may be provided with a module 910 configured to obtain configuration information defining geographical areas, such as explained in connection with step 810. Further, the wireless communication device 900 device may be provided with a module 920 configured to receive an incoming D2D transmission, such as explained in connection with step 820. Further, the wireless communication device 900 may be provided with a module 930 configured to determine whether it is a target recipient of a received D2D transmission, such as explained in connection with step 830. Further, the wireless communication device 900 may be provided with a module 940 configured to send an outgoing D2D transmission, such as explained in connection with step 840.

It is noted that the wireless communication device 900 may include further modules for implementing other functionalities, such as known functionalities of a UE in the LTE and/or NR radio technology. Further, it is noted that the modules of the wireless communication device 900 do not necessarily represent a hardware structure of the wireless communication device 900, but may also correspond to functional elements, e.g., implemented by hardware, software, or a combination thereof.

Figure 10:
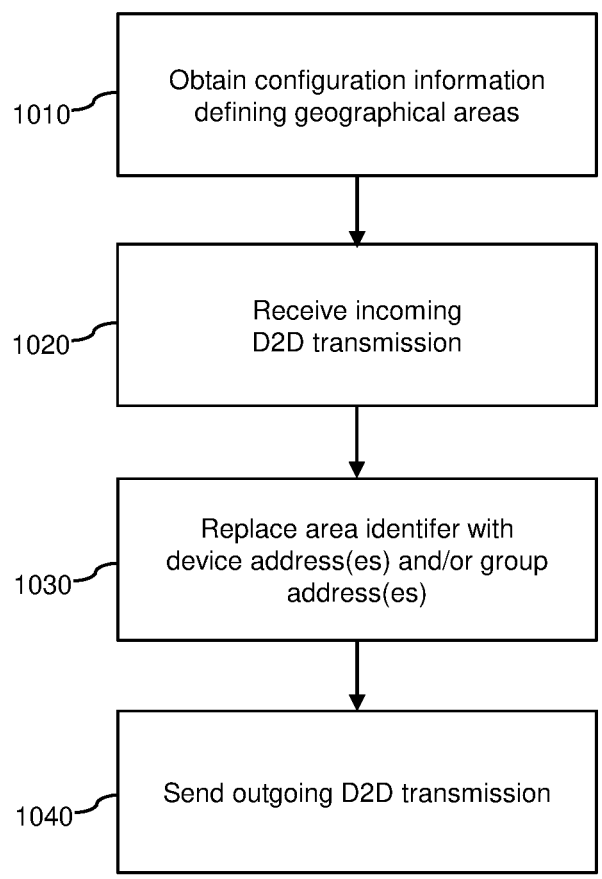
FIG. 10 shows a flowchart for schematically illustrating a further method according to an embodiment of the invention.

FIG. 10 shows a flowchart for illustrating a method, which may be utilized for implementing the illustrated concepts. The method of FIG. 10 may be used for implementing the illustrated concepts in a wireless communication device, e.g., corresponding to any of the above-mentioned UEs. In some scenarios, the wireless communication device may be a vehicle or vehicle-mounted device, but other types of WD, e.g., as mentioned above, could be used as well.

If a processor-based implementation of the wireless communication device is used, at least some of the steps of the method of FIG. 10 may be performed and/or controlled by one or more processors of the wireless communication device. Such wireless communication device may also include a memory storing program code for implementing at least some of the below described functionalities or steps of the method of FIG. 10.

At step 1010, the wireless communication device obtains configuration information defining multiple geographical areas. The wireless communication device may receive at least a part of the configuration information by RRC signaling while the wireless communication device is connected to a wireless communication network. Alternatively or in addition, the wireless communication device may receive at least a part of the configuration information by broadcasted system information while the wireless communication device is in coverage of a wireless communication network. Alternatively or in addition, the wireless communication device may receive at least a part of the configuration information by operator preconfiguration. The geographical areas may for example be defined in terms of longitude, latitude, width along the latitude direction, and/or length along the longitude direction. In some scenarios the geographical areas may be defined based on zones as also used for resource assignment for D2D transmissions, e.g., as used for allocating resource pools in the sidelink mode of the LTE or NR technology.

At step 1020, the wireless communication device receives an incoming D2D transmission. The incoming D2D transmission includes an area identifier to identify one of the geographical areas as target geographical area of the incoming D2D transmission and to address the incoming D2D transmission to one or more wireless communication devices in the identified target geographical area of the incoming D2D transmission.

The wireless communication device may receive the incoming D2D transmission via one or more multi-hop D2D paths each formed by one or more intermediate wireless communication devices forwarding the D2D transmission from one D2D path segment to a next D2D path segment. Each of these one or more multi-hop D2D paths may include one of the one or more wireless communication devices providing a direct D2D path between two geographical areas, i.e., gateways.

In some scenarios, the incoming D2D transmission may include multiple area identifiers to identify two or more of the geographical areas as target geographical areas of the incoming D2D transmission and to address the incoming D2D transmission to one or more wireless communication devices in the identified target geographical areas of the incoming D2D transmission.

The wireless communication device may determine based on the geographical area where the wireless communication device is located and the identified target geographical area of the received incoming D2D transmission, whether the wireless communication device is a target recipient of the received incoming D2D transmission. For this purpose, the wireless communication device may also determine its own geographical position, e.g., based on satellite positioning measurements, network based positioning measurements, and/or other positioning mechanisms.

In some scenarios, the incoming D2D transmission may also include additional address information to address the incoming D2D transmission to a subset of the wireless communication devices in the target geographical area of the incoming D2D transmission. In such cases, the wireless communication device may further consider the additional address information when determining whether it is a target recipient of the D2D transmission.

At step 1030, in response to the wireless communication device being located in the target geographical area of the incoming D2D transmission, the wireless communication device replaces the area identifier of the incoming D2D transmission with at least one device identifier and/or group identifier assigned to at least one wireless communication device which is located in the target geographical area.

At step 1040, the wireless communication device sends an outgoing D2D transmission which forwards at least a part of the received incoming D2D transmission with the area identifier being replaced by the at least one device identifier and/or the at least one group identifier.

In some scenarios, the wireless communication device may decide whether to forward the incoming D2D transmission based on at least one of the following conditions being met:

The wireless communication device did not receive the same D2D transmission before.

The signal power from the source of the D2D transmission is below a threshold value.

The wireless communication device has a direct or multi-hop D2D connection to other wireless communication devices in the target geographical area and these other wireless communication devices do not have a direct D2D path to the wireless communication device from where the incoming D2D transmission was received at step 1020.

The wireless communication device may send the outgoing D2D transmission via one or more multi-hop D2D paths each formed by one or more intermediate wireless communication devices forwarding the D2D transmission from one D2D path segment to a next D2D path segment.

The wireless communication device may control the sending of the outgoing D2D transmission based on various information stored by the wireless communication device. Controlling sending of the outgoing D2D transmission may for example involve selecting an output D2D path or selecting a unicast transmission mode, groupcast transmission mode, and/or broadcast transmission mode.

The information used for controlling sending of the outgoing D2D transmission may be part of the above-mentioned routing tables. The information may for example indicate one or more other wireless communication devices connected by a direct D2D path to the wireless communication device. These wireless communication devices may include wireless communication devices located in the same geographical area as the wireless communication device and wireless communication devices located in one or more adjacent geographical areas. The wireless communication device may store the information based on one or more incoming D2D transmissions received from other wireless communication devices.

In some scenarios, the information may include a device identifier of each of the one or more other wireless communication devices. Further, the information may include, for each of the one or more other wireless communication devices, an area identifier of the geographical area where the other wireless communication device is located. Further, the information may indicate, for each of the one or more other wireless communication devices, further wireless communication devices connected by a D2D path to the wireless communication device. The second information may thus indicate multi-hop information which allows for determining which other wireless communication devices could be reached through the other wireless communication device. Further, the second information may indicate, for each of the one or more other wireless communication devices, whether the other wireless communication device provides a direct D2D path between a first geographical area, where the wireless communication device is located, and at least one second geographical area which is adjacent to the first geographical area, i.e., whether the other wireless communication device is a gateway.

Figure 11:
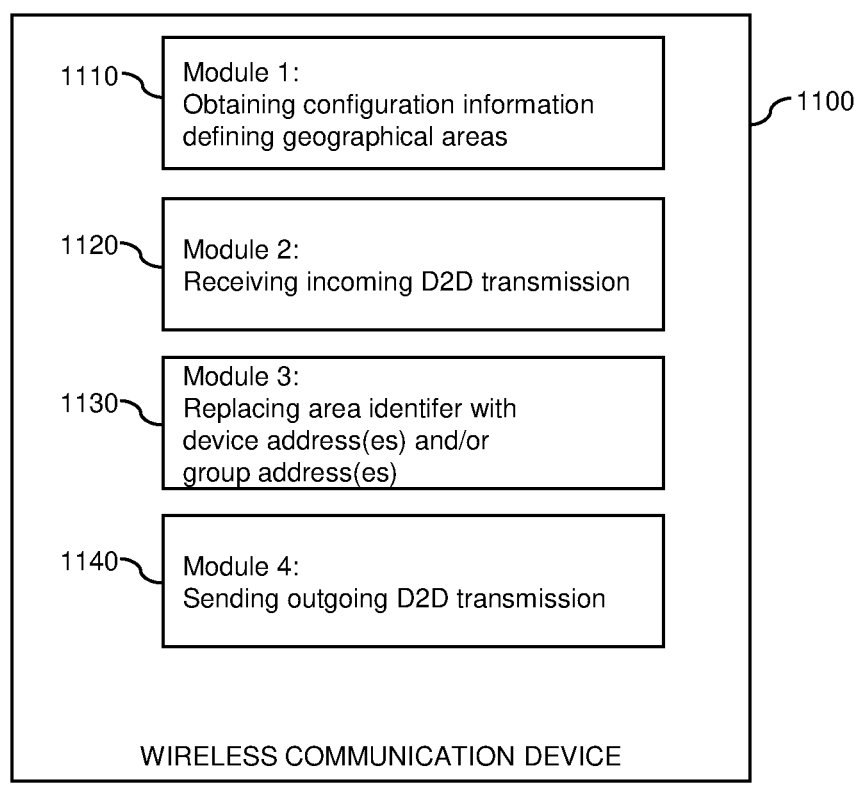
FIG. 11 shows an exemplary block diagram for illustrating functionalities of a wireless communication device implementing functionalities corresponding to the method of FIG. 10.

FIG. 11 shows a block diagram for illustrating functionalities of a wireless communication device 1100 which operates according to the method of FIG. 10. The wireless communication device 1100 may for example correspond to any of the above-mentioned UEs. As illustrated, the wireless communication device 1100 may be provided with a module 1110 configured to obtain configuration information defining geographical areas, such as explained in connection with step 1010. Further, the wireless communication device 900 device may be provided with a module 1120 configured to receive an incoming D2D transmission, such as explained in connection with step 1020. Further, the wireless communication device 1100 may be provided with a module 1130 configured to replace an area identifier of the received incoming D2D transmission, such as explained in connection with step 1030. Further, the wireless communication device 1100 may be provided with a module 1140 configured to send an outgoing D2D transmission, such as explained in connection with step 1040.

It is noted that the wireless communication device 1100 may include further modules for implementing other functionalities, such as known functionalities of a UE in the LTE and/or NR radio technology. Further, it is noted that the modules of the wireless communication device 1100 do not necessarily represent a hardware structure of the wireless communication device 1100, but may also correspond to functional elements, e.g., implemented by hardware, software, or a combination thereof.

It is to be understood that the functionalities as described in connection with FIGS. 6 to 11 may also be combined in various ways, e.g., in a system which includes two or more of a wireless communication device operating according to the method of FIG. 6, a wireless communication device operating according to the method of FIG. 8, and a wireless communication device operating according to the method of FIG. 10. For example, a first wireless communication device could operate according to the method of FIG. 6 to send the outgoing D2D transmission, and a second wireless communication device could operate according to the method of FIG. 6 or 8 to handle this outgoing D2D transmission as the incoming D2D transmission of step 820 or of step 1020. Further, the same wireless communication device could implement functionalities corresponding to the steps of two or more of the method of FIG. 6, the method of FIG. 8, and the method of FIG. 10.

Figure 12:
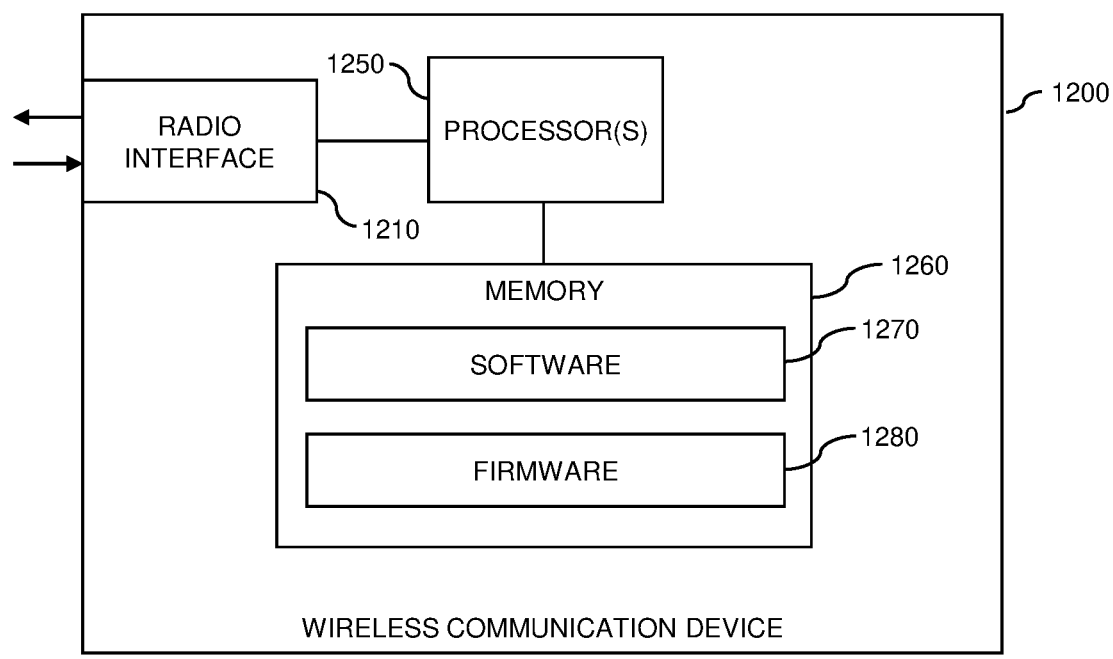
FIG. 12 schematically illustrates structures of a wireless communication device according to an embodiment of the invention.

FIG. 12 illustrates a processor-based implementation of a wireless communication device 1200 which may be used for implementing the above-described concepts. For example, the structures as illustrated in FIG. 12 may be used for implementing the concepts in any of the above-mentioned UEs.

As illustrated, the wireless communication device 1200 includes one or more radio interfaces 1210. The radio interface(s) 1210 may for example be based on the NR technology or the LTE technology. The radio interface(s) 1210 may support D2D communication, e.g., using sidelink communication as specified for the NR technology or the LTE technology.

Further, the wireless communication device 1200 may include one or more processors 1250 coupled to the radio interface(s) 1210 and a memory 1260 coupled to the processor(s) 1250. By way of example, the radio interface(s) 1210, the processor(s) 1250, and the memory 1260 could be coupled by one or more internal bus systems of the wireless communication device 1200. The memory 1260 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1260 may include software 1270 and/or firmware 1280. The memory 1260 may include suitably configured program code to be executed by the processor(s) 1250 so as to implement the above-described functionalities for controlling D2D communication, such as explained in connection with FIGS. 6 to 11.

It is to be understood that the structures as illustrated in FIG. 12 are merely schematic and that the wireless communication device 1200 may actually include further components which, for the sake of clarity, have not been illustrated, e.g., further interfaces, such as a dedicated management interface, or further processors. Also, it is to be understood that the memory 1260 may include further program code for implementing known functionalities of a UE. According to some embodiments, also a computer program may be provided for implementing functionalities of the wireless communication device 1200, e.g., in the form of a physical medium storing the program code and/or other data to be stored in the memory 1260 or by making the program code available for download or by streaming.

As can be seen, the concepts as described above may be used for efficiently addressing D2D transmissions. In particular, the concepts may be used for efficiently targeting a D2D transmission to devices in a certain geographical area. This may be achieved with low signaling overhead and high resource efficiency. Further, the illustrated concepts may allow for efficiently determining a single or multi-hop D2D path to the target geographical area. This may also help to avoid or reduce possible transmission delays.

It is to be understood that the examples and embodiments as explained above are merely illustrative and susceptible to various modifications. For example, the illustrated concepts may be applied in connection with various kinds of radio technologies, without limitation to the LTE technology or NR technology, e.g., in connection with WLAN technologies. Further, the concepts may be applied with respect to various types of UEs, without limitation to vehicle-based UEs. Further, the concepts may be applied in connection with various services supported by D2D communication, without limitation to V2X or NSPS services. Further, the concepts may be applied to various protocol layer, without limitation to PHY, MAC, or application layer, e.g., to the IP (Internet Protocol) layer or PDCP (Packet Data Convergence Protocol)/Adaptation layer, and utilize identifiers provided by these protocol layers to identify the UEs, groups of UEs or geographical areas. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling device-to-device (D2D) communication, the method performed by a wireless communication device and comprising:
    obtaining configuration information defining multiple geographical areas;
    when the wireless communication device is located in a first one of the multiple geographical areas and an outgoing D2D transmission has a target geographical area that is a different one of the multiple geographical areas, determining one or more wireless communication devices that are located in the first geographical area and that provide a D2D path to the target geographical area; and
    sending the outgoing D2D transmission via one or more multi-hop D2D paths, wherein:
        the outgoing D2D transmission comprises an area identifier that identifies the target geographical area of the outgoing D2D transmission and that addresses the outgoing D2D transmission to one or more wireless communication devices in the target geographical area, and
        each of the one or more multi-hop D2D paths includes at least one of the one or more wireless communication devices located in the first geographical area.

2. The method according to claim 1, wherein
    each multi-hop D2D path includes one or more intermediate wireless communication devices arranged to forward the D2D transmission from one D2D path segment to a next D2D path segment.

3. The method according to claim 2, wherein:
    the one or more wireless communication devices located in the first geographical area provide a direct D2D path to at least one second geographical area which is adjacent to the first geographical area and is expected to provide a D2D path to the target geographical area.

4. The method according to claim 3, wherein one or more of the following applies:
- the outgoing D2D transmission comprises respective device identifiers for the one or more wireless communication devices providing a direct D2D path to the at least one second geographical area; and
- each of the one or more multi-hop D2D paths includes a further wireless communication device located in the second geographical area and providing a direct D2D path to the first geographical area.

5. The method according to claim 3, further comprising:
- in response to determining multiple wireless communication devices providing a direct D2D path to the at least one second geographical area, selecting at least one of the multiple wireless communication devices providing a direct D2D path to the at least one second geographical area of the outgoing D2D transmission; and
- sending the first D2D transmission via the at least one multi-hop D2D path including the selected at least one of the multiple wireless communication devices providing a direct D2D path to the second geographical area of the outgoing D2D transmission.

6. The method according to claim 5, further comprising:
- for the multiple wireless communication devices providing a direct D2D path to the at least one second geographical area, determining respective numbers of D2D path segments to the target geographical area of the outgoing D2D transmission; and
- selecting the at least one of the multiple wireless communication devices providing a direct D2D path to the at least one second geographical area based on the determined numbers of D2D path segments to the target geographical area of the outgoing D2D transmission.

7. The method according to claim 5, further comprising:
- for each particular one of the multiple wireless communication devices providing a direct D2D path to the at least one second geographical area, determining a number of D2D path segments from the wireless communication device to the particular wireless communication device providing a direct D2D path to the at least one second geographical area; and
- selecting the at least one of the multiple wireless communication devices providing a direct D2D path to the at least one second geographical area based on the respective numbers of D2D path segments determined for the respective wireless communication devices providing a direct D2D path to the at least one second geographical area.

8. The method according to claim 5, further comprising:
- for each particular one of the multiple wireless communication devices providing a direct D2D path to the at least one second geographical area, determining respective channel qualities of at least one D2D path segment between the wireless communication device and the particular wireless communication device providing a direct D2D path to the at least one second geographical area; and
- selecting the at least of the multiple wireless communication devices providing a direct D2D path to the at least one second geographical area based on the determined channel qualities.

9. The method according to claim 5, further comprising:
- selecting at least two of the multiple wireless communication devices providing a direct D2D path to the at least second geographical area; and
- sending the D2D transmission via the multi-hop D2D paths including the selected at least two of the multiple wireless communication devices providing a direct D2D path to the at least one second geographical area.

10. The method according to claim 3, further comprising:
- for each particular second geographical area which is adjacent to the first geographical area, storing first information indicating one or more wireless communication devices located in the first geographical area and providing a direct D2D path to the particular second geographical area; and
- based on the stored first information, determining the one or more wireless communication devices providing a direct D2D path to the at least one second geographical area.

11. The method according to claim 1, further comprising:
- storing second information indicating one or more other wireless communication devices connected by a direct D2D path to the wireless communication device; and
- controlling the sending of the outgoing D2D transmission based on the stored second information.

12. The method according to claim 11, wherein one or more of the following applies:
- the second information comprises one or more of the following for each of the one or more other wireless communication devices: a device identifier, and an area identifier of the geographical area where the other wireless communication device is located; and
- the second information indicates one or more of the following for each of the one or more other wireless communication devices:
  - further wireless communication devices connected by a D2D path to the wireless communication device; and
  - whether the other wireless communication device provides a direct D2D path between the first geographical area and at least one second geographical area which is adjacent to the first geographical area.

13. The method according to claim 1, further comprising:
- receiving an incoming D2D transmission comprising the area identifier to identify one of the geographical areas as target geographical area of the incoming D2D transmission and to address the incoming D2D transmission to one or more wireless communication devices in the identified target geographical area; and
- forwarding at least a part of the received incoming D2D transmission in the outgoing D2D transmission.

14. The method according to claim 13, further comprising, in response to the wireless communication device being located in the target geographical area of the incoming D2D transmission, adding to the outgoing D2D transmission at least one device identifier and/or group identifier assigned to at least one wireless communication device which is located in the target geographical area.

15. The method according to claim 1, further comprising:
- receiving an incoming D2D transmission comprising an area identifier to identify one of the geographical areas as target geographical area of the incoming D2D transmission and to address the incoming D2D transmission to one or more wireless communication devices in the identified target geographical area; and
- based on the geographical area where the wireless communication device is located and the identified target geographical area, determining whether the wireless communication device is a target recipient of the received incoming D2D transmission.

16. The method according to claim 15, wherein:
the incoming D2D transmission comprises additional address information to address the incoming D2D transmission to a subset of the wireless communication devices in the target geographical area of the incoming D2D transmission, and
determining whether the wireless communication device is a target recipient of the received incoming D2D transmission is further based on the additional address information.

17. The method according to claim 1, wherein one of the following applies:
the outgoing D2D transmission is addressed to all wireless communication devices in the target geographical area of the outgoing D2D transmission;
the outgoing D2D comprises additional address information to address the outgoing D2D transmission to a subset of the wireless communication devices in the target geographical area of the outgoing D2D transmission; or
the outgoing D2D transmission comprises multiple area identifiers to identify two or more of the geographical areas as target geographical areas of the outgoing D2D transmission and to address the outgoing D2D transmission to one or more wireless communication devices in the identified target geographical areas of the outgoing D2D transmission.

18. A method of controlling device-to-device (D2D) communication, the method performed by a wireless communication device and comprising:
obtaining configuration information defining multiple geographical areas;
receiving an incoming D2D transmission via one or more multi-hop D2D paths, wherein:
the incoming D2D transmission comprises an area identifier to that identifies one of the multiple geographical areas as a target geographical area of the incoming D2D transmission and that addresses the incoming D2D transmission to one or more wireless communication devices in the identified target geographical area, and
each of the one or more multi-hop D2D paths includes at least one wireless communication device located in a first geographical area that is a different one of the multiple geographical areas; and
based on whether the wireless communication device is located in the identified target geographical area, determining whether the wireless communication device is a target recipient of the incoming D2D transmission.

19. The method according to claim 18, wherein:
each of the one or more multi-hop D2D paths includes one or more intermediate wireless communication devices arranged to forward the incoming D2D transmission from one D2D path segment to a next D2D path segment; and
at least one of the one or more multi-hop D2D paths includes at least one wireless communication device providing a direct D2D path between two of the geographical areas.

20. The method according to claim 18, wherein one of the following applies:
the incoming D2D transmission is addressed to all wireless communication devices in the target area;
the incoming D2D transmission comprises additional address information to address the incoming D2D transmission to a subset of the wireless communication devices in the target geographical area, and determining whether the wireless communication device is a target recipient of the incoming D2D transmission is further based on the additional address information; or
the incoming D2D transmission comprises multiple area identifiers to identify two or more of the geographical areas as target geographical areas of the incoming D2D transmission and to address the outgoing D2D transmission to one or more wireless communication devices in the identified target geographical areas of the incoming D2D transmission.

21. A method of controlling device-to-device (D2D) communication, the method performed by a wireless communication device and comprising:
obtaining configuration information defining multiple geographical areas;
receiving an incoming D2D transmission comprising an area identifier to identify one of the geographical areas as target geographical area of the incoming D2D transmission and to address the incoming D2D transmission to one or more wireless communication devices in the identified target geographical area of the incoming D2D transmission;
in response to the wireless communication device being located in the target geographical area of the incoming D2D transmission, replacing the area identifier with at least one device identifier and/or at least one group identifier assigned to at least one wireless communication device which is located in the identified target geographical area of the incoming D2D transmission; and
sending an outgoing D2D transmission which forwards at least a part of the received incoming D2D transmission with the area identifier being replaced by the at least one device identifier and/or the at least one group identifier.

22. The method according to claim 21, wherein:
the incoming D2D transmission is received via a multi-hop D2D path that includes by one or more intermediate wireless communication devices arranged to forward the D2D transmission from one D2D path segment to a next D2D path segment; and
the multi-hop D2D path includes at least one wireless communication device providing a direct D2D path between two of the geographical areas.

23. The method according 21, wherein one of the following applies:
the incoming D2D transmission is addressed to all wireless communication devices in the target area;
the incoming D2D transmission comprises additional address information to address the incoming D2D transmission to a subset of the wireless communication devices in the target geographical area; or
the incoming D2D transmission comprises multiple area identifiers to identify two or more of the geographical areas as target geographical areas of the incoming D2D transmission and to address the outgoing D2D transmission to one or more wireless communication devices in the identified target geographical areas of the incoming D2D transmission.

24. The method according to claim 21, further comprising, when the incoming D2D transmission comprises the additional address information, determining the at least one device identifier and/or the at least one group identifier based on the additional address information.

* * * * *